(12) United States Patent
Sato et al.

(10) Patent No.: US 12,078,309 B2
(45) Date of Patent: Sep. 3, 2024

(54) LAMP UNIT

(71) Applicant: KOITO MANUFACTURING CO., LTD., Tokyo (JP)

(72) Inventors: Ryuho Sato, Shizuoka (JP); Takahiko Honda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/796,036

(22) PCT Filed: Jan. 29, 2021

(86) PCT No.: PCT/JP2021/003404
§ 371 (c)(1),
(2) Date: Jul. 28, 2022

(87) PCT Pub. No.: WO2021/157495
PCT Pub. Date: Aug. 12, 2021

(65) Prior Publication Data
US 2023/0097767 A1 Mar. 30, 2023

(30) Foreign Application Priority Data

Feb. 7, 2020 (JP) .................... 2020-019408
Jul. 22, 2020 (JP) .................... 2020-125312

(51) Int. Cl.
*F21S 41/25* (2018.01)
*F21S 41/29* (2018.01)

(52) U.S. Cl.
CPC ............. *F21S 41/25* (2018.01); *F21S 41/295* (2018.01)

(58) Field of Classification Search
CPC ........ F21S 41/25; F21S 41/295; F21S 41/153; F21S 41/675; F21S 41/36; G02B 7/021; G02B 7/026; G02B 19/0066; G02B 13/18; F21V 5/00; F21V 17/00; F21V 7/00; F21V 14/04; F21Y 2115/10; G03B 21/14
See application file for complete search history.

(56) References Cited

U.S. PATENT DOCUMENTS

2013/0215395 A1* 8/2013 Li ..................... G02B 13/18
359/713

FOREIGN PATENT DOCUMENTS

| CN | 102043220 | A | * | 5/2011 | ............. G02B 7/022 |
| CN | 110319418 | A | | 10/2019 | |
| EP | 3546822 | A1 | * | 10/2019 | ............. F21S 41/25 |
| JP | 2007-052957 | A | | 3/2007 | |
| JP | 2016-091976 | A | | 5/2016 | |

(Continued)

OTHER PUBLICATIONS

Search English translation of JP 2017040901 A (Year: 2017).*

(Continued)

*Primary Examiner* — Omar Rojas Cadima
(74) *Attorney, Agent, or Firm* — Venjuris, P.C.

(57) ABSTRACT

A lamp unit irradiates light emitted from a light source and reflected by a spatial light modulator, toward a front of the unit through a projection lens. The projection lens is constituted by a plurality of lenses disposed side by side in a front-rear direction of the unit. The plurality of lenses are supported by a common lens holder. In the plurality of lenses, a lens located on a rearmost side of the unit is constituted by a glass lens and remaining lenses are constituted by a resin lens.

17 Claims, 23 Drawing Sheets

(56) References Cited

FOREIGN PATENT DOCUMENTS

| | | | |
|---|---|---|---|
| JP | 2016-120770 A | | 7/2016 |
| JP | 2017040901 A | * | 2/2017 |
| JP | 2018-014285 A | | 1/2018 |

OTHER PUBLICATIONS

Search English translation of CN 102043220 A (Year: 2011).*
Search English translation of EP-3546822-A1 (Year: 2019).*
Search English translation of JP-2018014285-A (Year: 2018).*
International Search Report issued on Mar. 30, 2021 for WO 2021/157495 A1 (9 pages).

* cited by examiner

LAMP UNIT

CROSS REFERENCE TO RELATED APPLICATIONS

This application is a national phase of PCT application No. PCT/JP2021/003404, filed on 29 Jan. 2021, which claims priority from Japanese patent application No. 2020-019408, filed on 7 Feb. 2020, and No. 2020-125312, filed on 22 Jul. 2020, all of which are incorporated herein by reference.

TECHNICAL FIELD

The present disclosure relates to a lamp unit including a reflective spatial light modulator.

Further, the present disclosure relates to a lamp unit including a plurality of light emitting control elements disposed in a matrix shape.

BACKGROUND

In the related art, an in-vehicle lamp unit is known, which irradiates light emitted from a light source and reflected by a spatial light modulator, toward the front of the unit through a projection lens.

Further, in the related art, an in-vehicle lamp unit configured to irradiate light from a plurality of light emitting control elements disposed in a matrix shape toward a front of the unit through a projection lens is known.

Patent Document 1 discloses a lamp unit in which the projection lens is constituted by a plurality of lenses disposed side by side in the front-rear direction of the unit and the lenses are supported by a common lens holder.

PRIOR ART DOCUMENT

Patent Document
 Patent Document 1: Japanese Laid-Open Patent Publication No. 2016-91976

SUMMARY OF THE INVENTION

Problem to be Solved

Similarly to the lamp unit disclosed in Patent Document 1, by adopting a configuration in which a plurality of lenses is supported by a common lens holder, the accuracy of the positional relationship between the lenses may be improved, and thus, a desired optical characteristic may be easily obtained.

In such a lamp unit, when the plurality of lenses that constitute the projection lens is constituted by a resin lens, the degree of freedom of the outer shape or the like may be improved, and thus, the design of the lamp unit may be improved.

However, in this case, due to radiant heat generated by light from the light source reflected by the spatial light modulator or heat generated in the vicinity of the light source and accumulated in the inner space of the lens holder, the resin lens may be deformed or the physical properties thereof may be changed. Then, when such thermal deformation of the resin lens occurs, the desired optical characteristic as the projection lens may not be obtained.

Firstly, the present disclosure is to provide a lamp unit including a reflective spatial light modulator, which can obtain the desired optical characteristic and improve the design thereof.

Further, in the lamp unit disclosed in Patent Document 1, it is desirable that the lens located on the rearmost side of the unit is configured as a biconvex lens in order to improve the optical characteristic as the projection lens.

However, when the lens located on the rearmost side of the unit amount the plurality of lenses is configured as a biconvex lens, the following problems occur.

That is, when the biconvex lens is constituted by a glass lens, it is not easy to sufficiently secure the surface accuracy of the front surface and the rear surface thereof. Further, when the biconvex lens is constituted by a resin lens, the central portion may become relatively thick, so that a sink mark is likely to occur at the time of molding, and thus, it is not easy to manufacture the biconvex lens with high accuracy.

When the lens located on the rearmost side of the unit is configured as a biconvex lens as described above, the manufacturing cost is high in order to maintain the optical characteristic as the projection lens.

Secondly, the present disclosure is to provide a lamp unit configured to irradiate light from a plurality of light emitting control elements disposed in a matrix shape toward the front of the unit through a projection lens, which can maintain an optical characteristic of the projection lens while reducing the costs.

Means to Solve the Problem

One aspect of the present disclosure is to achieve the first aim by researching the materials of a plurality of lenses that constitutes the projection lens.

That is, one aspect of the present disclosure provides a lamp unit that irradiates light emitted from a light source and reflected by a spatial light modulator toward a front of the unit through a projection lens,
 in which the projection lens is constituted by a plurality of lenses disposed side by side in a front-rear direction of the unit,
 the plurality of lenses are supported by a common lens holder, and
 in the plurality of lenses, a lens located on a rearmost side of the unit is constituted by a glass lens and remaining lenses are constituted by a resin lens.

Further, another aspect of the present disclosure is to achieve the second aim by researching the lens configuration.

That is, one aspect of the present disclosure provides a lamp unit configured to irradiate light from a plurality of light emitting control elements disposed in a matrix shape toward a front of the unit through a projection lens,
 in which the projection lens is constituted by a plurality of lenses disposed side by side in a front-rear direction of the unit,
 the plurality of lenses are supported by a common lens holder,
 in the plurality of lenses, the lens located on the rearmost side of the unit is configured as a first plano-convex lens having a convex-curved surface that bulges toward the rear of the unit, and
 the lens adjacent to a unit front side of the first plano-convex lens is configured as a second plano-convex lens having a convex-curved surface that bulges toward the front of the unit.

Effect of the Invention

According to the present disclosure, the lamp unit is configured to irradiate light emitted from the light source and reflected by the spatial light modulator toward the front of the unit through the projection lens, and thus, various light distribution patterns may be formed with high accuracy by controlling the spatial distribution of the reflected light in the spatial light modulator.

At this time, the projection lens is constituted by a plurality of lenses disposed side by side in the front-rear direction of the unit, and the plurality of lenses are supported by the common lens holder. Therefore, the accuracy of the positional relationship between the lenses may be sufficiently secured, and thus, a desired optical characteristic may be easily obtained.

Additionally, in the plurality of lenses, the lens located on the rearmost side of the unit is constituted by a glass lens and remaining lenses are constituted by a resin lens, so that the following effects may be obtained.

That is, assuming that all the plurality of lenses that constitute the projection lens are constituted by a resin lens, in the lens located on the rearmost side of the unit, the resin lens may be deformed and the physical properties thereof may be changed due to radiant heat generated by light from the light source reflected by the spatial light modulator or heat generated in the vicinity of the light source and accumulated in the inner space of the lens holder. Therefore, by changing the lens from a resin lens to a glass lens, it may efficiently suppress from not obtaining the desired optical characteristic as the projection lens due to the thermal deformation.

Meanwhile, since the remaining lenses other than the lens located on the rearmost side of the unit, which is hardly affected by heat, are constituted by a resin lens, the degree of freedom of the outer shape or the like may be improved, and thus the design of the lamp unit may be improved.

As described above, according to the present disclosure, in the lamp unit including a reflective spatial light modulator, the design may be improved while obtaining a desired optical characteristic.

Since the lamp unit according to the present disclosure is configured to irradiate light from a plurality of light emitting control elements disposed in a matrix shape toward the front of the unit through the projection lens, various light distribution patterns may be formed with high accuracy by controlling the plurality of light emitting control elements.

At this time, since the projection lens is constituted by a plurality of lenses disposed side by side in the front-rear direction of the unit, and the plurality of lenses are supported by the common lens holder, the accuracy of the positional relationship between the lenses may be sufficiently secured, and thus, a desired optical characteristic may be easily obtained.

Additionally, in the plurality of lenses, since the lens located on the rearmost side of the unit is configured as the first plano-convex lens having the convex-curved surface that bulges toward the rear of the unit, and the lens adjacent to the unit front side of the first plano-convex lens is configured as the second plano-convex lens having the convex-curved surface that bulges toward the front of the unit, it is possible to have a lens function substantially the same as the case where the lens located on the rearmost side of the unit is configured as a biconvex lens.

Further, by adopting the first and second plano-convex lenses instead of a biconvex lens, the manufacturing cost may be reduced.

That is, when each of the first and second plano-convex lenses is constituted by a glass lens, it is sufficient to mold the lens surface on the convex-curved surface side using a molding, and thus, the lenses may be easily manufactured with high accuracy. Further, when each of the first and second plano-convex lenses is constituted by a resin lens, the thickness of the central portion is substantially halved as compared with the case where the lenses are configured as one biconvex lens, and thus, a sink mark at the time of molding is not likely to occur. Therefore, the optical characteristic as the projection lens may be maintained while reducing the manufacturing cost of the first and second plano-convex lenses.

As described above, according to the present disclosure, in the lamp unit configured to irradiate light from a plurality of light emitting control elements disposed in a matrix shape toward the front of the unit through the projection lens, the optical characteristic of the projection lens may be maintained while reducing the costs.

DETAILED DESCRIPTION TO EXECUTE THE INVENTION

In the present disclosure, a specific configuration of a "spatial light modulator" is not particularly limited as long as, when light from a light source is reflected, it can control the spatial distribution of the reflected light. For example, the spatial light modulator using a digital micro mirror or using a reflective liquid crystal may be adopted.

In the present disclosure, the specific shape or material of a "lens holder" is not particularly limited.

In the present disclosure, a "projection lens" is constituted by a plurality of lenses, but the number of the lenses is not particularly limited.

In the present disclosure, the specific shape of a "glass lens" is not particularly limited.

In the present disclosure, the specific shape or material of a "resin lens" is not particularly limited.

In the present disclosure, the specific configuration of "a plurality of light emitting control elements" is not particularly limited as long as the light emitting control elements are configured to individually emit light in a state of being disposed in a matrix shape in the rear side of the unit from the projection lens. The plurality of light emitting control elements which are configured to control the reflection of light emitted from a light source, such as a digital micro mirror or a reflective liquid crystal, which are configured to control the transmission of light emitted from a light source, such as a transmissive liquid crystal panel, or which are constituted by a plurality of light emitting element that emits light itself such as a micro LED may be adopted.

In the present disclosure, as long as "a first plano-convex lens" is a plano-convex lens having a convex-curved surface that bulges toward the rear of the unit, the specific shape of the convex-curved surface is not particularly limited.

In the present disclosure, as long as "a second plano-convex lens" is a plano-convex lens having a convex-curved surface that bulges toward the front of the unit, the specific shape of the convex-curved surface is not particularly limited.

In the present disclosure, the specific material of each of the "first plano-convex lens" and the "second plano-convex lens" is not particularly limited.

In the present disclosure, the specific configuration of a "protrusion" is not particularly limited as long as it may define a distance between the first plano-convex lens and the second plano-convex lens by abutting on the front surface of the first plano-convex lens. For example, a rib-shaped protrusion formed in an annular shape or a plurality of hemispherical protrusions formed at intervals in the circumferential direction may be adopted.

Hereinafter, an embodiment of the present disclosure will be described with reference to drawings.

First Embodiment

Figure 1:
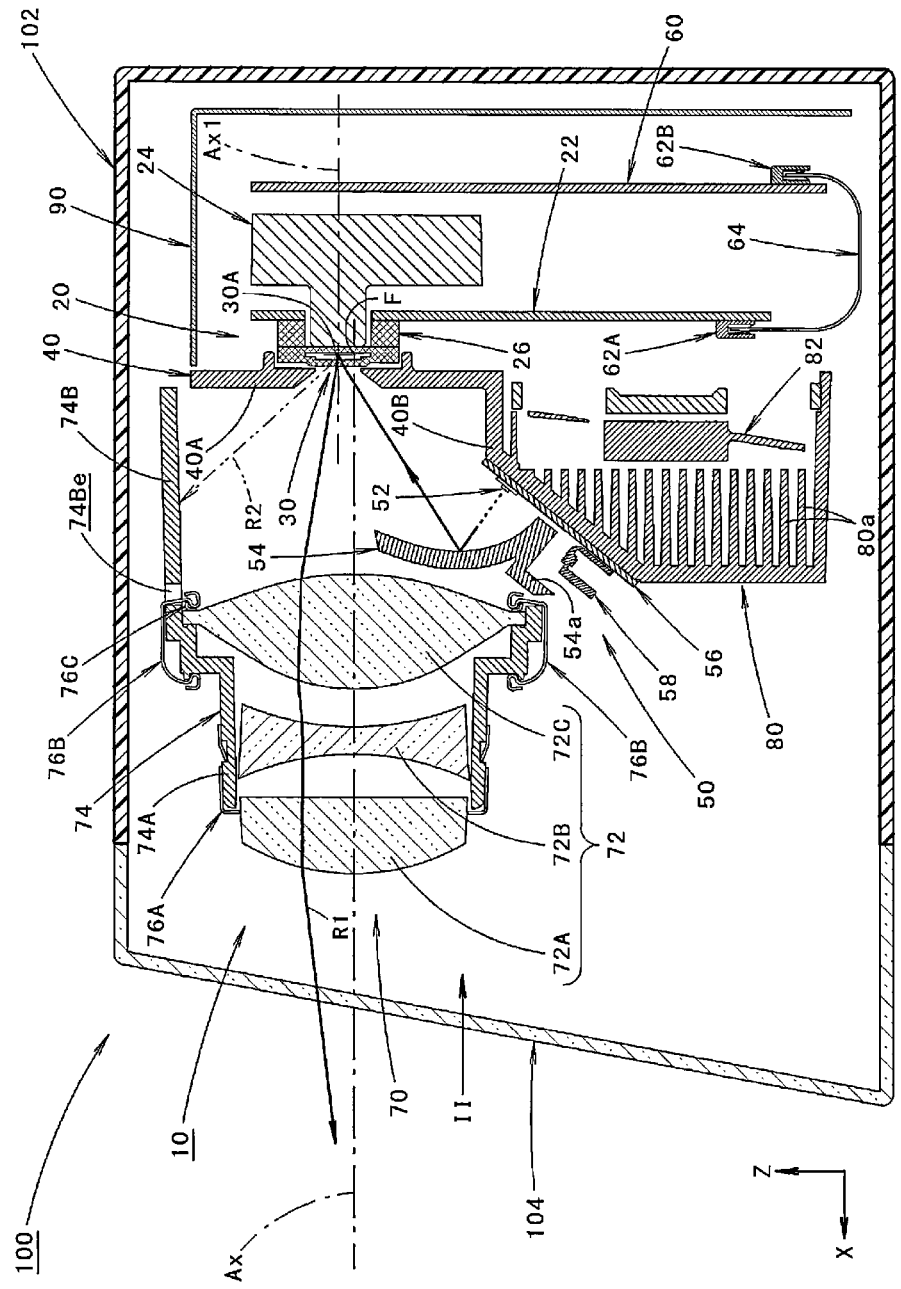
FIG. 1 is a vertical cross-sectional view illustrating a vehicle lamp including a lamp unit according to a first embodiment of the present disclosure.

FIG. 1 is a vertical cross-sectional view illustrating a vehicle lamp 100 including a lamp unit 10 according to a first embodiment of the present disclosure.

Figure 2:
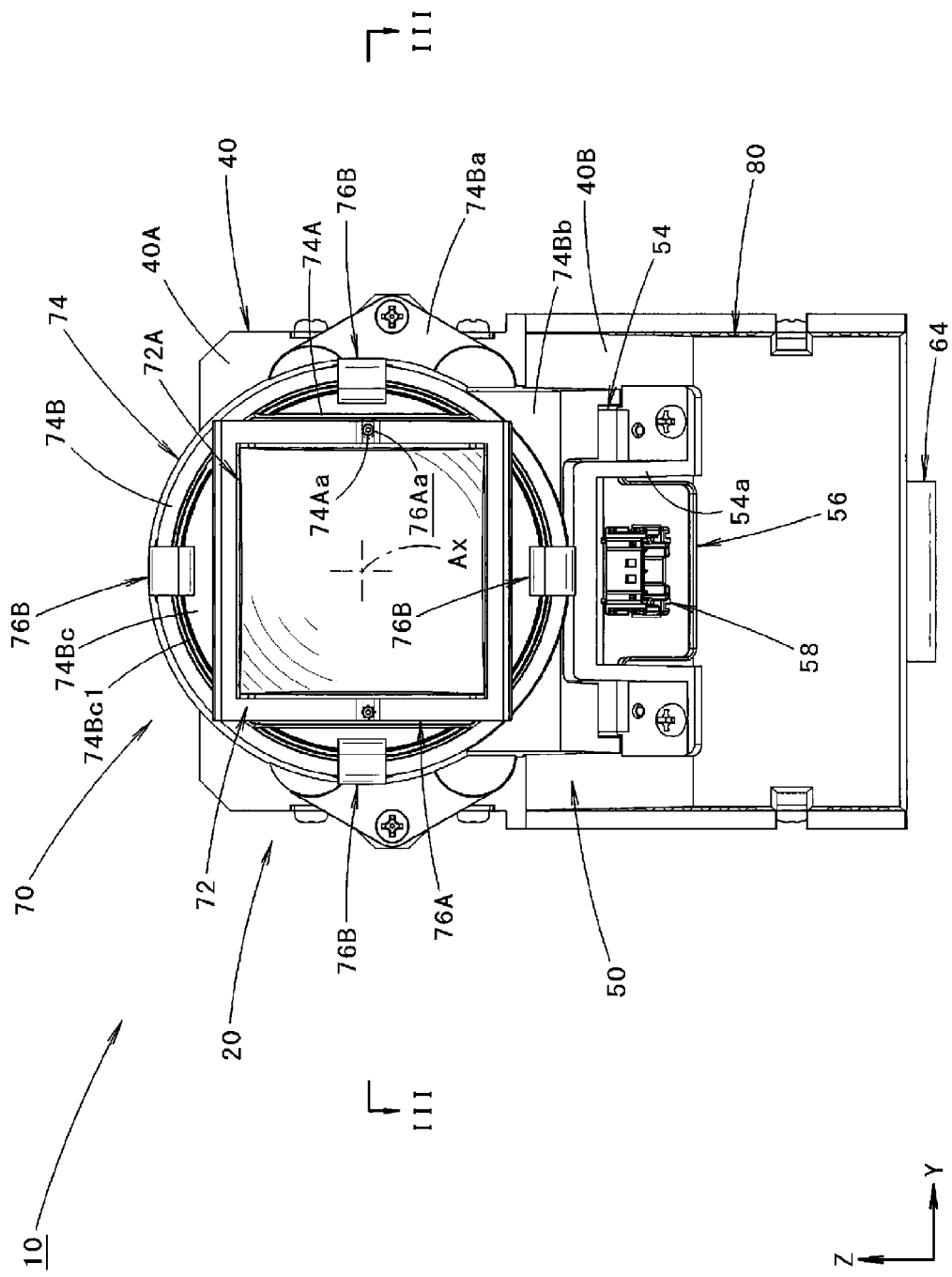
FIG. 2 is a front view illustrating the lamp unit viewed from a direction II in FIG. 1.
Figure 3:
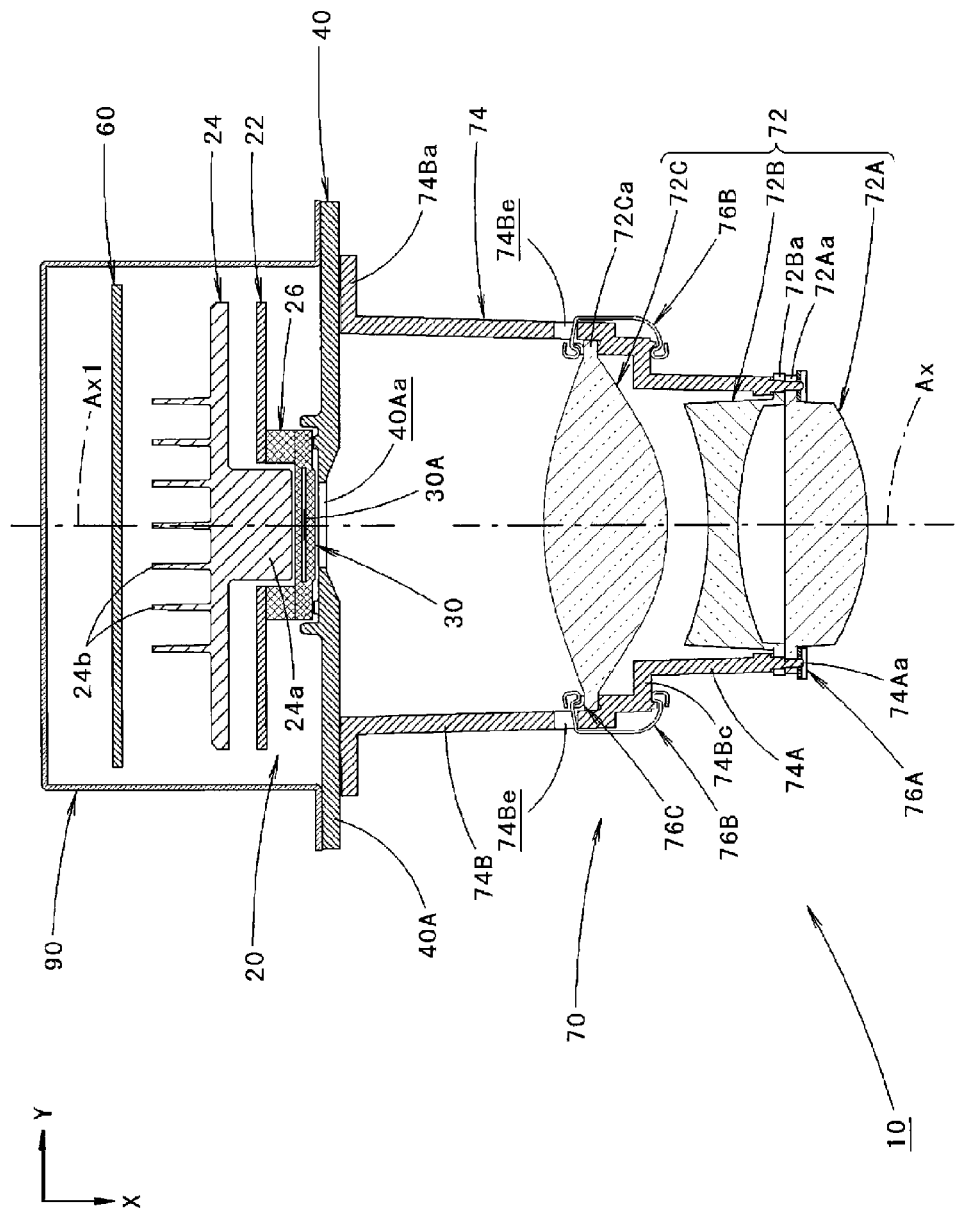
FIG. 3 is a cross-sectional view taken along line III-III in FIG. 2.
Figure 4:
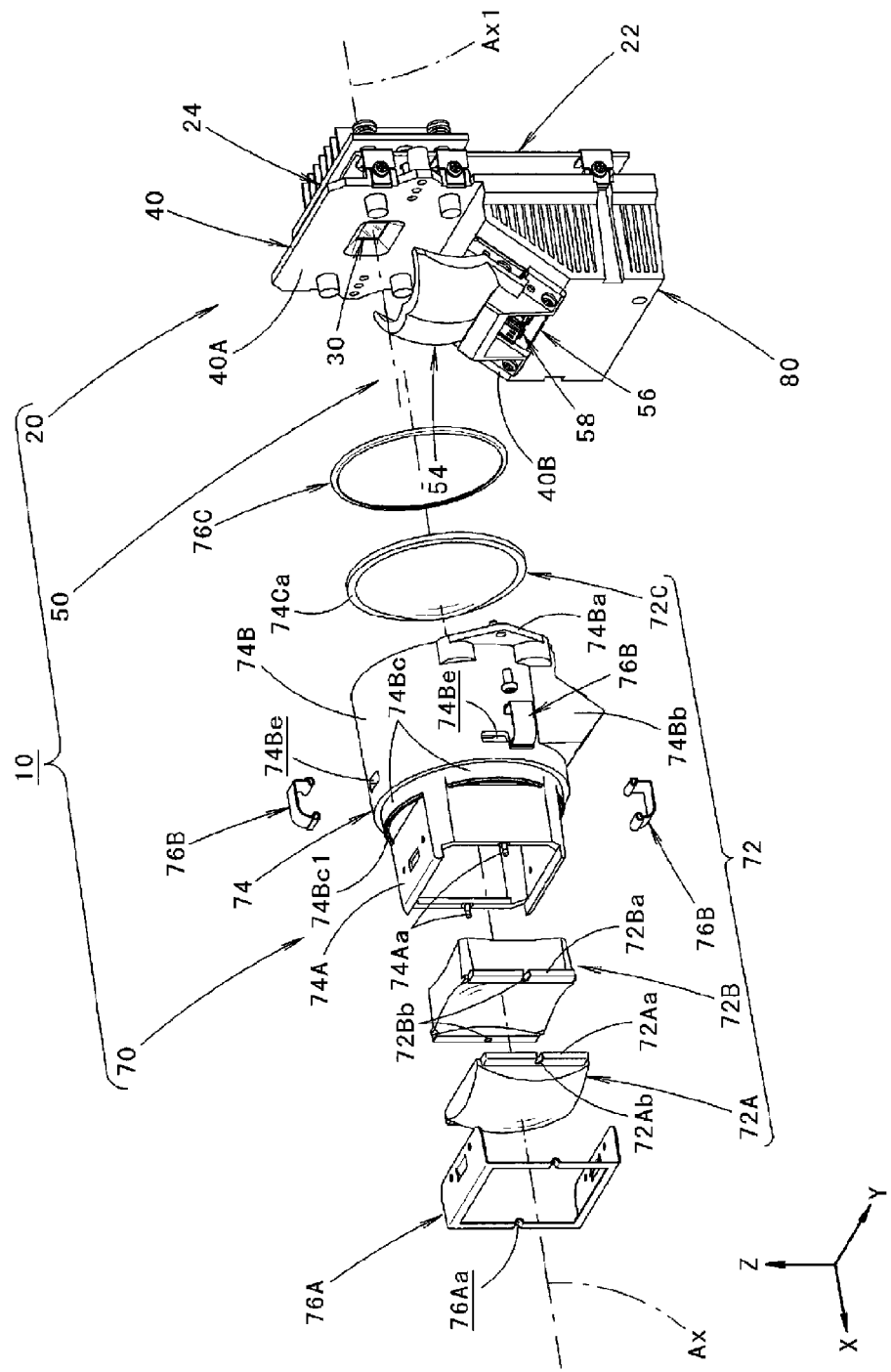
FIG. 4 is a perspective view illustrating the lamp unit by exploding into main components.

Further, FIG. 2 is a front view illustrating the lamp unit 10 when viewed from a direction II in FIG. 1, and FIG. 3 is a cross-sectional view taken along line III-III in FIG. 2. Further, FIG. 4 is a perspective view illustrating the lamp unit 10 by exploding into main components.

In the drawings, the direction indicated by X is the "front of the unit", the direction indicated by Y is the "left direction" orthogonal to the "front of the unit" ("right direction" in the front view of the unit), and the direction indicated by Z is the "upper direction." The same are applied to other drawings.

The vehicle lamp 100 is a road surface drawing lamp provided at the front end of a vehicle, and the lamp unit 10 is accommodated in a lamp chamber formed by a lamp body 102 and a translucent cover 104. The lamp unit 10 is accommodated in a state where the front-rear direction (i.e., front-rear direction of the unit) is coincided with the front-rear direction of the vehicle.

The lamp unit 10 includes a spatial light modulation unit 20, a light source-side sub-assembly 50, a lens-side sub-assembly 70, and a bracket 40 that supports them.

The bracket 40 is a metal member (e.g., made of aluminum die-cast), and includes a vertical surface portion 40A that extends along a vertical plane orthogonal to the front-rear direction of the unit, and a shelf-shaped portion 40B that extends toward the front of the unit in the lower region of the vertical surface portion 40A.

The lamp unit 10 is supported by the lamp body 102 via a mounting structure (not illustrated) in the vertical surface portion 40A of the bracket 40, and is configured to be tilted in the vertical direction and the left-right direction with respect to the lamp body 102.

The spatial light modulation unit 20 includes a spatial light modulator 30, a support substrate 22 disposed in the rear side of the unit from the spatial light modulator 30, and a heat sink 24 disposed in the rear side of the unit from the support substrate 22. The support substrate 22 is formed to extend downward from the heat sink 24.

The light source-side sub-assembly 50 includes a pair of left and right light sources (specifically, light emitting diodes) 52 mounted on a substrate 56, and a reflector 54 that reflects light emitted from each light source 52 toward the spatial light modulation unit 20. A reflecting surface of the reflector 54 is configured to converge the light emitted from each light source 52 to a position displaced upward with respect to a rear focal point F (see FIG. 1) of a projection lens 72. A connector 58 configured to supply power to the pair of left and right light sources 52 is mounted on the substrate 56.

The shelf-shaped portion 40B of the bracket 40 is formed to extend in the horizontal direction toward the front of the unit from the vertical surface portion 40A, and then, to obliquely extend toward the inclined lower-side front. The substrate 56 and the reflector 54 of the light source-side sub-assembly 50 are supported on an upper surface of the inclined region. In a lower end portion of the reflector 54, a mounting leg portion 54a configured to mount the bracket 40 to the shelf-shaped portion 40B is formed to surround the connector 58.

The lens-side sub-assembly 70 includes the projection lens 72 having an optical axis Ax that extends in the front-rear direction of the unit and a lens holder 74 that supports the projection lens 72, and is supported by the bracket 40 at the rear end portion of the lens holder 74.

On the lower side of the shelf-shaped portion 40B of the bracket 40, a heat sink 80 and a cooling fan 82 are disposed to dissipate heat generated by turn-on of each light source 52. The heat sink 80 is integrally formed with the bracket 40, and includes a plurality of heat radiation fins 80a that extends toward the rear of the unit. The cooling fan 82 is disposed in the rear side of the unit from the plurality of heat radiation fins 80a.

The lamp unit 10 according to the first embodiment may form a light distribution pattern (i.e., road surface drawing light distribution pattern) that draws a character or a symbol on the road surface in front of the vehicle by irradiating light from each light source 52 reflected by the reflector 54 toward the front of the unit through the spatial light modulator 30 and the projection lens 72.

In order to implement this, the lamp unit 10 includes a control substrate 60 to which a control circuit (not illustrated) that controls the spatial light modulator 30 based on a video signal from an in-vehicle camera (not illustrated) is mounted.

As illustrated in FIG. 1, the control substrate 60 is disposed in the rear side of the unit from the heat sink 24, and is supported by an electromagnetic shield cover 90 (to be described later) or the like via a support member (not illustrated). Then, the control substrate 60 is electrically connected to the support substrate 22 via a flexible print wiring board 64. That is, a first connector 62A is mounted to the support substrate 22, and a second connector 62B is mounted to the control substrate 60. Then, one end of the flexible print wiring board 64 that extends in a U shape is inserted into an opening of the first connector 62A from below, and the other end of the flexible print wiring board 64 is inserted into an opening of the second connector 62B from the lower side.

Figure 5:
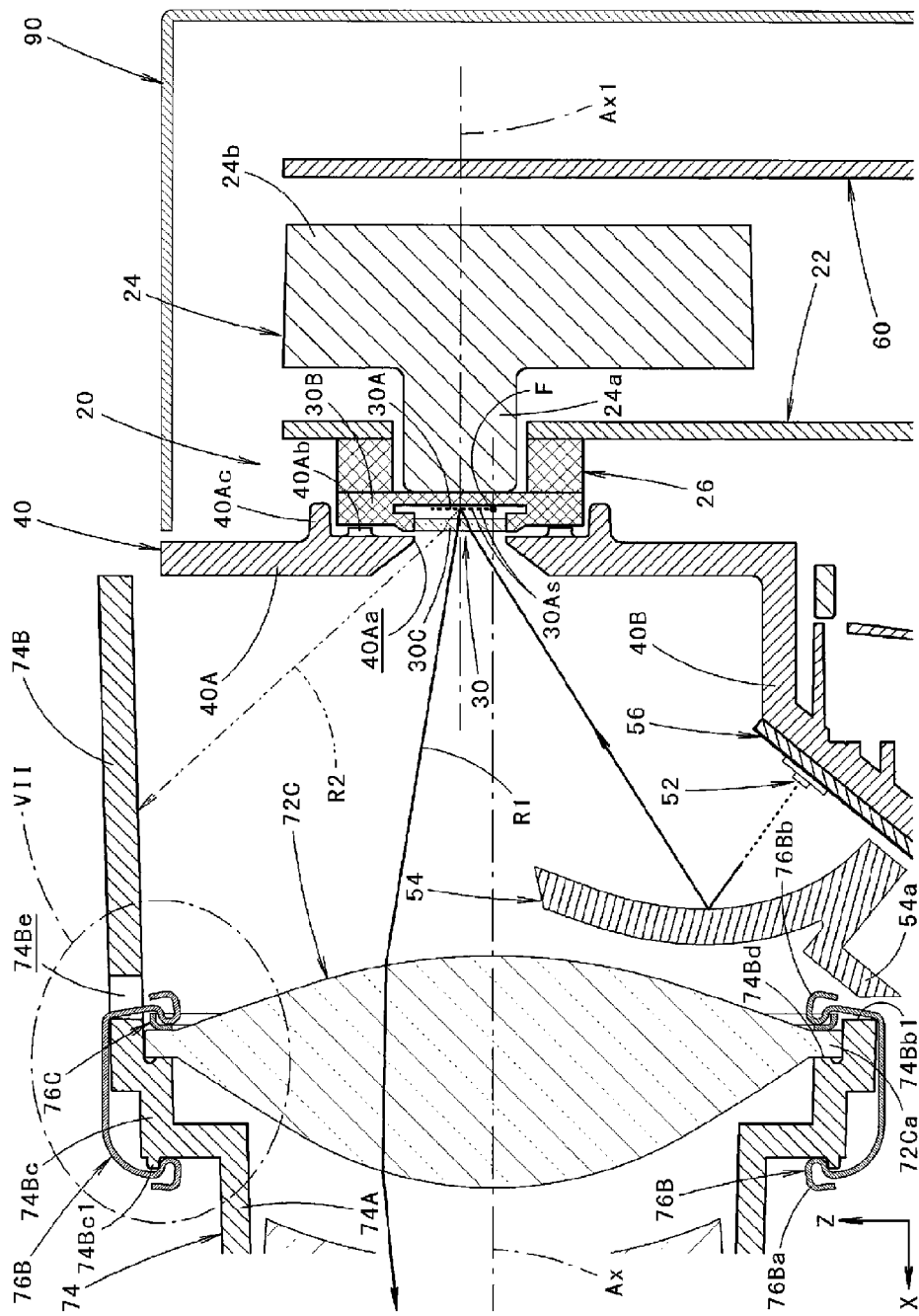
FIG. 5 is a view illustrating a detail of a main portion in FIG. 1.

FIG. 5 is a view illustrating a detail of the main portion in FIG. 1.

As illustrated in FIG. 5, the spatial light modulator 30 is a digital micro mirror device (DMD). The spatial light modulator 30 includes a reflection controller 30A in which a plurality of reflection elements (specifically, hundreds of thousands of fine mirrors) 30As is disposed, a housing portion 30B that accommodates the reflection controller 30A, and a translucent plate 30C supported by the housing portion 30B in a state of being disposed in the front side of the unit from the reflection controller 30A.

The spatial light modulator 30 is disposed such that the reflection controller 30A is located on the vertical plane orthogonal to the optical axis Ax at the rear focal point F of the projection lens 72. The central axis Ax1 of the reflection controller 30A extends in the front-rear direction of the unit at a position displaced upward with respect to the optical axis Ax.

Then, the spatial light modulator 30 may selectively switch the reflection direction of the light from each light source 52 that reaches each reflection element 30As, by controlling the angle of the reflecting surface of each of the plurality of reflection elements 30As that constitute the reflection controller 30A. Specifically, a first angular position that reflects light from each light source 52 in the direction (direction indicated by a solid line in FIG. 5) of an optical path R1 that is directed to the projection lens 72, and a second angular position that reflects light in the direction (direction indicated by a two-point chain line in FIG. 5) of an optical path R2 directed to the direction deviated from the projection lens 72 are selected. The direction deviated from the projection lens 72 is a direction that does not adversely affect the formation of a light distribution pattern.

Figure 6:
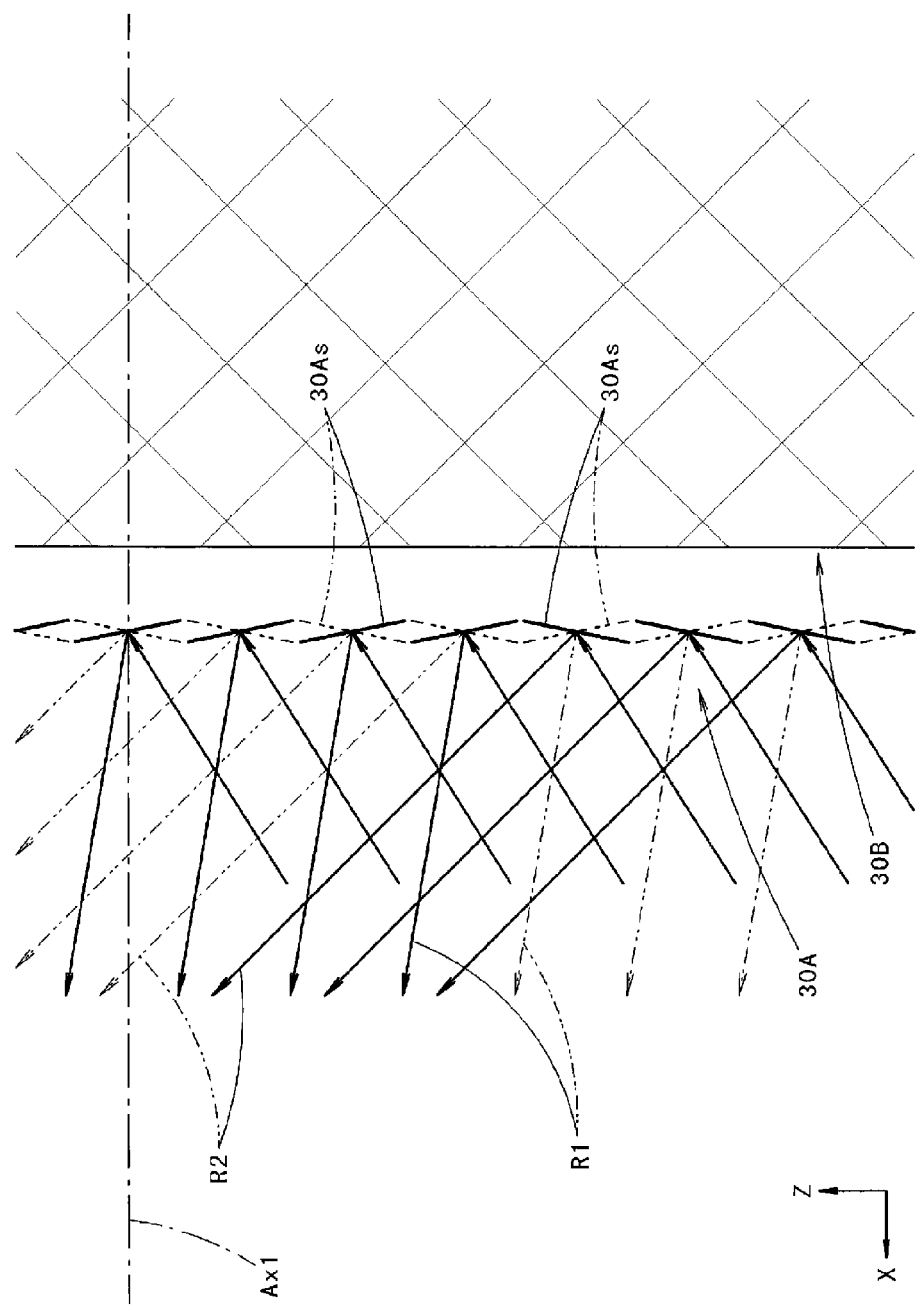
FIG. 6 is a view illustrating a detail of a main portion in FIG. 5

FIG. 6 is a view illustrating a detailed structure of the reflection controller 30A, which illustrates a detail of a main portion in FIG. 5.

As illustrated in FIG. 6, each reflection element 30As that constitutes the reflection controller 30A is configured to be rotatable around the horizontal axis that extends in the left-right direction. At the first angular position, each reflection element 30As is rotated downward by a predetermined angle (e.g., approximately 12°) with respect to the vertical plane orthogonal to the central axis Ax1 of the reflection controller 30A, and reflects the reflected light from the reflector 54 (see FIG. 5) toward the front of the unit as slightly upward light (light along the optical path R1). At the second angular position, each reflection element 30As is rotated upward by a predetermined angle (e.g., approximately 12°) with respect to the vertical plane orthogonal to the central axis Ax1, and reflects the reflected light from the reflector 54 toward the front of the unit as considerably upward light (light along the optical path R2).

The switching between the first angular position and the second angular position is performed by controlling energization of an electrode (not illustrated) disposed in the vicinity of a member (not illustrated) that rotatably supports each reflection element 30As. In a neutral state where the enegization of the electrode is not performed, each reflection element 30As is disposed to be flush with each other along the vertical plane in which the reflecting surface thereof is orthogonal to the central axis Ax1.

FIG. 6 illustrates a state where the reflection element 30As located in the region in the vicinity of the central axis Ax1 of the reflection controller 30A is at the first angular position, and the reflection element 30As located in the lower region is at the second angular position.

As illustrated in FIG. 5, the support substrate 22 is disposed to extend along the vertical plane (i.e., vertical plane orthogonal to the optical axis Ax and the central axis Ax1) orthogonal to the front-rear direction of the unit, and a conductive pattern (not illustrated) is formed on the front surface. Then, a peripheral edge of the housing portion 30B of the spatial light modulator 30 is supported by the support substrate 22 from the rear side of the unit via a socket 26, and thus, the spatial light modulator 30 is electrically connected to the support substrate 22.

The spatial light modulator 30 is supported from both sides in the front-rear direction of the unit by the vertical surface portion 40A of the bracket 40 and the heat sink 24.

The heat sink 24 is disposed to extend along the vertical plane orthogonal to the front-rear direction of the unit, and a protrusion 24a that protrudes toward the front of the unit in a prismatic shape is formed on the front surface thereof, and a plurality of heat radiation fins 24b that extends toward the rear of the unit is formed on the rear surface thereof. Then, the heat sink 24 abuts on the central portion of the housing portion 30B of the spatial light modulator 30 at the tip surface of the protrusion 24a.

In the vertical surface portion 40A of the bracket 40, a horizontally long rectangular opening 40Aa surrounding the translucent plate 30C of the spatial light modulator 30 is formed. The opening 40Aa has an inner peripheral surface shape chamfered so as to expand toward the front of the unit over the entire circumference.

Further, in the rear surface of the vertical surface portion 40A of the bracket 40, a protrusion 40Ab that protrudes toward the rear of the unit in a columnar shape is formed at three locations surrounding the opening 40Aa, and on an outer peripheral side thereof, an annular flange portion 40Ac that protrudes toward the rear of the unit is formed to extend in a horizontally long rectangular shape.

The vertical surface portion 40A of the bracket 40 abuts on the front surface of the housing portion 30B of the spatial light modulator 30 at the tip surface of the protrusion 40Ab at three locations. The bracket 40 is configured such that the annular flange portion 40Ac covers the spatial light modulator 30 over the entire circumference in the abutting state.

As illustrated in FIG. 1, the electromagnetic shield cover 90 configured to protect the spatial light modulator 30 from noise generated due to the repeat of the turning-on/off of the light source 52 is disposed in the rear side of the unit from the bracket 40. The electromagnetic shield cover 90 is made of metal (e.g., steel), and is fixed to the vertical surface portion 40A of the bracket 40 by, for example, screwing in a state of being disposed to cover the spatial light modulation unit 20 and the control substrate 60 from the rear side of the unit. The electromagnetic shield cover 90 constitutes a part of the lamp unit 10, but the lamp unit 10 is illustrated in FIG. 4 in a state where the electromagnetic shield cover 90 is removed.

Next, the specific configuration of the lens-side sub-assembly 70 will be described.

As illustrated in FIGS. 1 to 4, the projection lens 72 is constituted by total three of a first lens 72A, a second lens 72B, and a third lens 72C disposed side by side in the front-rear direction of the unit on the optical axis Ax.

The first lens 72A located on the foremost side of the unit is configured as a plano-convex lens that bulges toward the front of the unit, the second lens 72B located in the middle is configured as a biconcave lens, and the third lens 72C located on the rearmost side of the unit is configured as a biconvex lens.

The first lens 72A is constituted by a resin lens (specifically, acrylic resin lens), the second lens 72B is constituted by a resin lens (specifically, polycarbonate resin lens), and the third lens 72C is constituted by a glass lens.

The first lens 72A and the second lens 72B have a rectangular (specifically, square) outer peripheral shape having substantially the same size when viewed from the front of the unit. The third lens 72C has a circular outer peripheral shape larger than the first lens 72A and the second lens 72B when viewed from the front of the unit, and specifically, has a circular outer peripheral shape slightly larger than a circumscribed circle of the first lens 72A and the second lens 72B.

The first lens 72A to the third lens 72C are supported by the common lens holder 74.

The lens holder 74 is a metal member (e.g., made of aluminum die-cast). A front region 74A thereof is formed to extend in a prismatic shape about the optical axis Ax, and a rear region 74B thereof is formed to extend in a cylindrical shape about the optical axis Ax.

A pair of left and right flange portions 74Ba is formed at the rear end portion of the lens holder 74. Then, the lens holder 74 is fixed to the vertical surface portion 40A of the bracket 40 at each flange portion 74Ba by screwing.

A lower end portion of the rear region 74B of the lens holder 74 is cut out, and a downward protruding portion 74Bb that protrudes downward is formed around the lower end portion of the rear region 74B.

The downward protruding portion 74Bb has a lower surface shape that conforms a horizontal plane shape of the shelf-shaped portion 40B of the bracket 40, an inclined surface shape of the shelf-shaped portion 40B, and an outer peripheral surface shape of the mounting leg portion 54a of the reflector 54. Then, the lens holder 74 is fixed to the vertical surface portion 40A of the bracket 40 in a state where the downward protruding portion 74Bb is placed on the shelf-shaped portion 40B of the bracket 40. Therefore, the lens holder 74 is disposed in a state where the space between the bracket 40 and the projection lens 72 is sealed.

A first metal fitting 76A is attached to the lens holder 74 from the front side of the unit. Therefore, the first lens 72A and the second lens 72B are fixed to the lens holder 74.

On an outer peripheral edge portion of the first lens 72A and the second lens 72B, a pair of left and right outer peripheral flange portions 72Aa and 72Ba that extends in the vertical direction are formed, respectively.

Then, the first lens 72A and the second lens 72B are supported by the front end surface of the front region 74A with respect to the lens holder 74 in a state where the pair of left and right outer peripheral flange portions 72Aa and 72Ba is overlapped with each other.

At the front end surface of the front region 74A, a pair of left and right positioning pins 74Aa that extends toward the front of the unit is formed. Each positioning pin 74Aa is located slightly below the horizontal plane including the optical axis Ax.

In the pair of left and right outer peripheral flange portions 72Aa and 72Ba on each of the first lens 72A and the second lens 72B, a pair of left and right engaging portions 72Ab and 72Bb that engages with the pair of left and right positioning pins 74Aa of the lens holder 74 is formed. Among the pair of left and right engaging portions 72Ab and 72Bb, the engaging portions 72Ab and 72Bb located on the right side are formed as engaging holes, and the engaging portions 72Ab and 72Bb located on the left side are formed as engaging grooves.

Then, when the first metal fitting 76A is attached to the lens holder 74, each of the first lens 72A and the second lens 72B is positioned in the vertical plane orthogonal to the optical axis Ax by engaging the engaging portions 72Ab and 72Bb of the pair of left and right outer peripheral flange portions 72Aa and 72Ba with the pair of left and right positioning pins 74Aa. In the first metal fitting 76A, a pair of left and right inserting holes 76Aa configured to insert the pair of left and right positioning pins 74Aa is formed.

Figure 7:
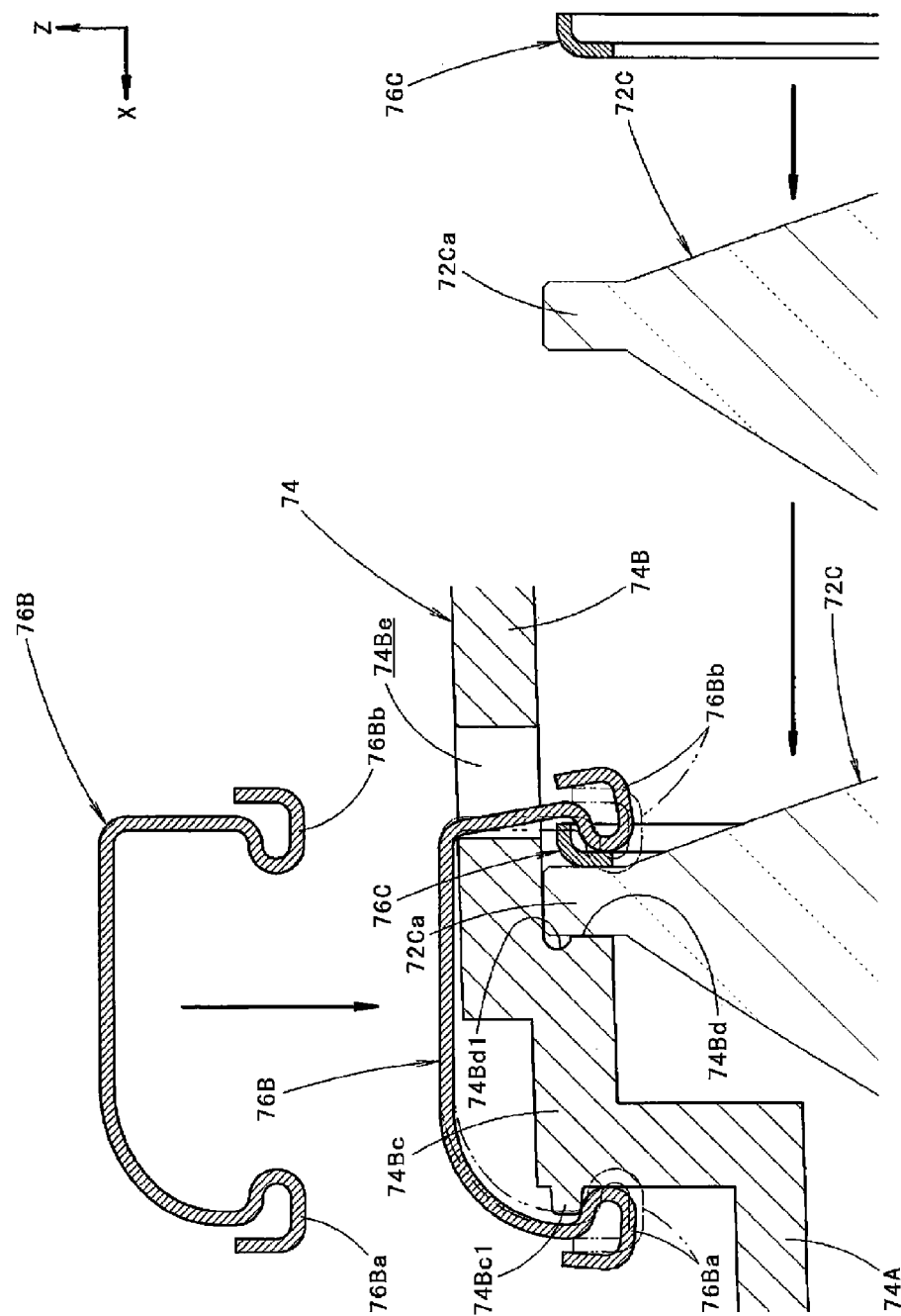
FIG. 7 is a view illustrating a detail of a portion VII in FIG. 5.

FIG. 7 is a view illustrating the detail of a portion VII in FIG. 5.

As illustrated in FIG. 7, at the front end position on the inner surface side of the rear region 74B of the lens holder 74, an annular surface 74Bd that extends in an annular shape about the optical axis Ax along the vertical plane orthogonal to the optical axis Ax is formed.

In an outer peripheral edge portion of the third lens 72C, an outer peripheral flange portion 72Ca having a constant width is formed over the entire circumference of the outer peripheral edge portion. Then, the third lens 72C is supported by the lens holder 74 in a state where the outer peripheral flange portion 72Ca is pressed against the annular surface 74Bd.

The outer diameter of the outer peripheral flange portion 72Ca is set to a value substantially the same as the inner diameter of the rear region 74B at the front end position. Further, an annular groove portion 74Bd1 is formed at an outer peripheral end portion of the annular surface 74Bd. Therefore, the third lens 72C is supported by the lens holder 74 in a state of being accurately positioned in the vertical plane orthogonal to the optical axis Ax and with respect to the front-rear direction of the unit.

The third lens 72C is supported by the lens holder 74 by attaching four clips 76B from the outer peripheral side to the third lens 72C in a state where a second metal fitting 76C is pressed against the outer peripheral flange portion 72Ca from the rear side of the unit.

The second metal fitting 76C is constituted by a metal plate formed to extend in an annular shape with a substantially L shape cross-sectional shape.

The clip 76B is constituted by a metal plate (specifically, spring steel plate) having a substantially C shape cross-sectional shape, and a front end portion 76Ba and a rear end portion 76Bb are folded outward in a substantially U shape.

The rear region 74B of the lens holder 74 is formed in a size substantially circumscribed with respect to the front region 74A, and an outer peripheral protruding portion 74Bc is formed. The outer peripheral protruding portion 74Bc is formed to protrude in an arc shape toward the outer peripheral side from the front region 74A at four locations located above and below and at the left and the right with respect to the optical axis Ax at the front end portion of the rear region 74B.

The outer diameter of each outer peripheral protruding portion 74Bc is set to a diameter (value) slightly smaller than the outer diameter of the general region of the rear region 74B. Further, on a front surface of each outer peripheral protruding portion 74Bc, a protrusion 74Bc1 having a flange shape extending in an arc shape along the outer peripheral end portion is formed.

The four clips 76B are attached using the outer peripheral protruding portion 74Bc at four locations. That is, the third lens 72C is positioned in the lens holder 74, and the rear surface of the second metal fitting 76C pressed against the rear surface of the third lens 72C and the front surface of each outer peripheral protruding portion 74Bc are sandwiched by each clip 76B, so that the clip 76B is attached.

In order to implement this, in the rear region 74B of the lens holder 74, a rectangular through hole 74Be is formed. The through hole 74Be is formed at three locations (specifically, three locations located immediately above and both left and right sides with respect to the optical axis Ax) in the outer peripheral surface in the vicinity of the front end portion of the rear region 74B in the circumferential direction.

Then, at these three locations, the front end portion 76Ba of each clip 76B is locked to the protrusion 74Bc1 of each outer peripheral protruding portion 74Bc, and the rear end portion 76Bb thereof is locked to the second metal fitting 76C in a state of being inserted into each through hole 74Be.

As illustrated in FIG. 7, each clip 76B becomes a state of being elastically deformed to some extent when attached to the lens holder 74, and thus, the positioning support of the third lens 72C is reliably performed.

Meanwhile, as illustrated in FIG. 5, in the rear region 74B of the lens holder 74, a front wall surface 74Bb1 of the downward protruding portion 74Bb (see FIG. 4) is formed to be flush with the front wall surface of each through hole 74Be.

Then, the clip 76B attached to the lens holder 74 immediately below the optical axis Ax is locked to the protrusion 74Bc1 of the outer peripheral protruding portion 74Bc at the front end portion 76Ba. The rear end portion 76Bb of the clip 76B is locked to the second metal fitting 76C in the vicinity of the front wall surface 74Bb1 of the downward protruding portion 74Bb.

As illustrated in FIG. 1, the optical axis Ax of the projection lens 72 is displaced downward with respect to the central axis Ax1 of the reflection controller 30A of the spatial light modulator 30. Therefore, the light that reaches the projection lens 72 from the reflection controller 30A is irradiated from the projection lens 72 toward the front of the unit as slightly downward light with respect to the horizontal direction, and thus, a road surface drawing light distribution pattern is formed on the road surface in front of the vehicle.

Figure 8:
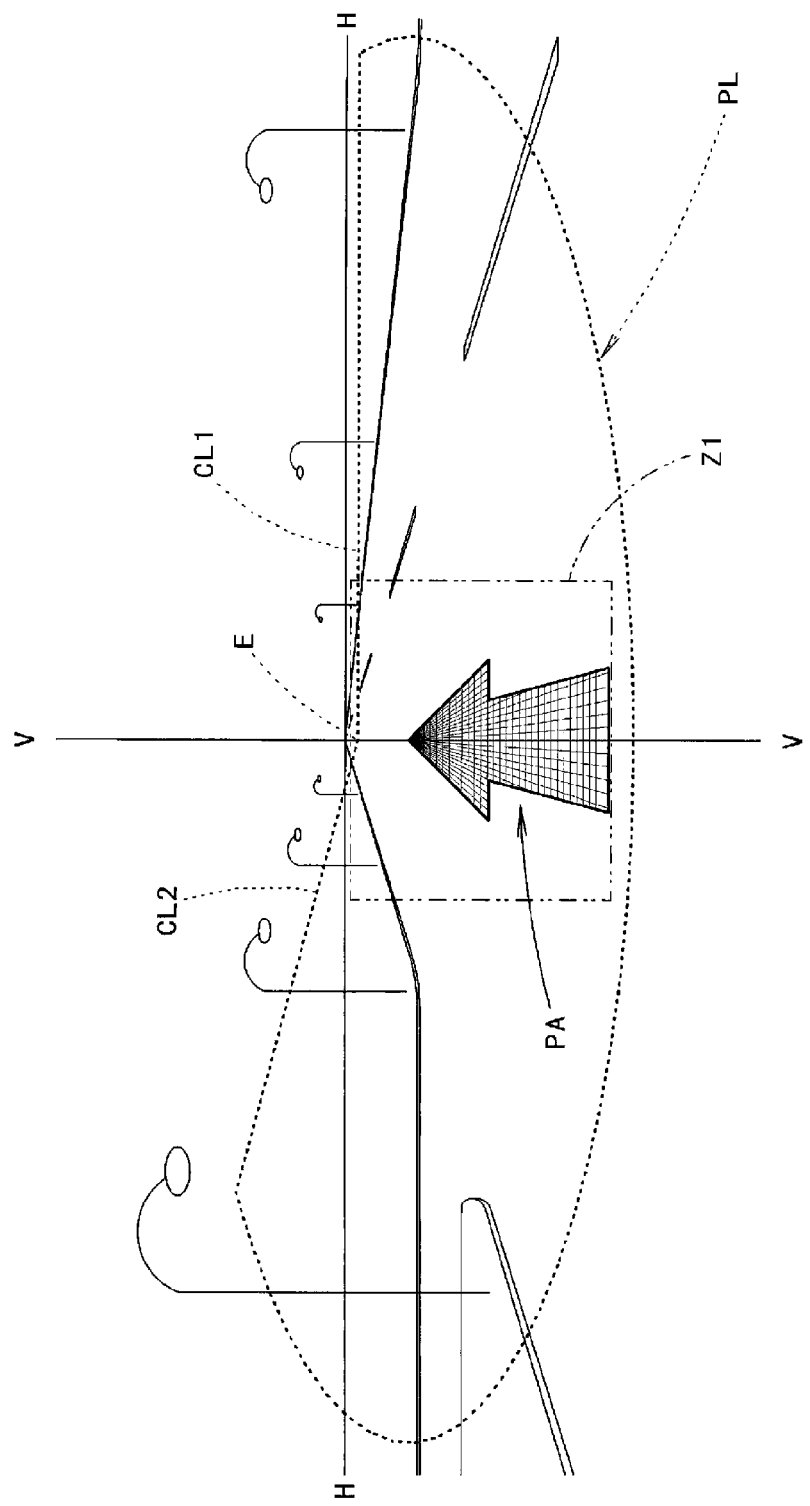
FIG. 8 is a view transparently illustrating a light distribution pattern formed by an irradiation light from the lamp unit.

FIG. 8 is a view transparently illustrating a light distribution pattern formed on a virtual vertical screen disposed at a position 25 m away from the front of the vehicle by an irradiation light from the vehicle lamp 100.

The light distribution pattern illustrated in FIG. 8 is a road surface drawing light distribution pattern PA, and is formed together with a low beam light distribution pattern PL formed by an irradiation light from another vehicle lamp (not illustrated). Prior to describing the road surface drawing light distribution pattern PA, the low beam light distribution pattern PL will be described.

The low beam light distribution pattern PL is a low beam light distribution pattern of a left side light distribution, and has cut-off lines CL1 and CL2 on the upper end edge thereof.

In the cut-off lines CL1 and CL2, a portion on an oncoming lane side on the right side of the V-V line that passes through the H-V, which is a vanishing point in the front direction of the lamp is formed as the horizontal cut-off line CL1, and a portion on am own lane side on the left side of the V-V line is formed as an inclined cut-off line CL2. An elbow point E, which is an intersection of the cut-off lines CL1 and CL2 is located about 0.5° to 0.6° below the H-V.

The road surface drawing light distribution pattern PA is a light distribution pattern that performs a road surface drawing to call attention to the surroundings, and is formed as a light distribution pattern that draws a character or a symbol on the road surface in front of the vehicle. The road surface drawing light distribution pattern PA illustrated in FIG. 8 is formed as a light distribution pattern in an arrow shape facing the front direction of the vehicle.

The road surface drawing light distribution pattern PA is formed by directing the reflected light from a part of the plurality of reflection elements 30As (e.g., reflection elements 30As located in the region set by the arrow shape) that constitute the reflection controller 30A of the spatial light modulator 30 toward the projection lens 72.

When the vehicle is traveling at night, by forming the road surface drawing light distribution pattern PA of the arrow shape, for example, the surrounding is notified that the vehicle is approaching an intersection in front of the vehicle to call attention.

A region Z1 indicated by a two-point chain line in FIG. 8 indicates the range in which various road surface drawing light distribution patterns PA may be formed. This region Z1 is a rectangular region about the V-V line, and the upper end edge thereof is located in the vicinity of the lower side of the H-H line that horizontally passes through the V-V.

Next, the operation of the first embodiment will be described.

The lamp unit 10 according to the first embodiment is configured to irradiate light from the light source 52 reflected by the spatial light modulator 30 toward the front of the unit through the projection lens 72, and thus, may form various road surface drawing light distribution patterns PA by controlling the spatial distribution of the reflected light in the spatial light modulator 30.

At this time, since the projection lens 72 is constituted by total three of the first lens 72A, the second lens 72B, and the third lens 72C disposed side by side in the front-rear direction, and the plurality of lenses are supported by the common lens holder 74, the accuracy of the positional relationship between the lenses may be sufficiently secured, and thus, a desired optical characteristic may be easily obtained.

Additionally, in the first lens 72A to the third lens 72C, the third lens 72C located on the rearmost side of the unit is constituted by a glass lens and the first lens 72A and the second lens 72B are constituted by a resin lens, so that the following effects may be obtained.

That is, assuming that all of the first lens 72A to the third lens 72C that constitute the projection lens 72 are constituted by a resin lens, in the lens located on the rearmost side of the unit, the resin lens may be deformed and the physical properties thereof may be changed due to radiant heat generated by light from the light source 52 reflected by the spatial light modulator 30 or heat generated in the vicinity of the light source 52 and accumulated in the inner space of the lens holder 74. Therefore, by changing the lens from a resin lens to a glass lens, it may efficiently suppress from not obtaining the desired optical characteristic as the projection lens 72 due to the thermal deformation.

Meanwhile, the first lens 72A and the second lens 72B other than the third lens 72C located on the rear most side of the unit are hardly affected by heat, and the first lens 72A and the second lens 72B are constituted by a resin lens. As a result, the degree of freedom of the outer shape or the like may be improved, and thus, the design of the lamp unit 10 may be improved.

As described above, according to the first embodiment, in the lamp unit 10 including the reflective spatial light modulator 30, the design may be improved while obtaining a desired optical characteristic.

At this time, in the first embodiment, since the outer diameter of the third lens 72C is set to a value larger than the outer diameters of the first lens 72A and the second lens 72B, it becomes easier to prevent the influence of heat on the first lens 72A and the second lens 72B constituted by a resin lens.

Further, in the first embodiment, since the third lens 72C has a circular outer shape and the first lens 72A and the second lens 72B have a rectangular outer shape, the following operation effects may be obtained.

That is, by configuring the first lens 72A and the second lens 72B located in the front side of the unit to have a rectangular outer shape, it is possible to easily improve the design of the lamp unit 10. At this time, since the first lens 72A and the second lens 72B are constituted by a resin lens, it is possible to easily configure to have a rectangular outer shape. Meanwhile, since the third lens 72C constituted by a glass lens has a circular outer shape, it may be easily manufactured, and thus, the cost of the lamp unit 10 may be reduced.

Further, since the third lens 72C is fixed to the lens holder 74 at a portion that protrudes to the outer peripheral side from the first lens 72A and the second lens 72B, the positioning of the third lens 72C may be easily performed.

At this time, since the through hole 74Be is formed at three locations of the lens holder 74 in the circumferential direction, and the third lens 72C is fixed to the lens holder 74 by the three clips 76B disposed through the three through holes 74Be, the positioning of the third lens 72C may be performed by a simple structure.

Further, the spatial light modulator 30 includes the plurality of reflection elements 30As that reflect light from the light source 52, and is configured as a digital micro mirror configured to selectively take the first angular position that reflects toward the projection lens 72 and the second angular position that reflects in the direction deviated from the projection lens 72 as an angular position of each reflection element 30As. Further, the lens holder 74 is constituted by a metal member, and is configured to block the reflected light from the reflection element 30As at the second angular position. That is, the lamp unit 10 has a configuration in which heat is easily transferred to the third lens 72C via the lens holder 74, and thus, it is particularly effective to adopt the configuration of the first embodiment.

Further, in the first embodiment, since the two lenses of the first lens 72A and the second lens 72B among the three lenses of the first lens 72A to the third lens 72C are constituted by a resin lens, the first lens 72A is configured as a plano-convex lens, and the second lens 72B is configured as a biconcave lens, even when some extent of heat deformation occurs, the change in optical characteristics between the first lens 72A and the second lens 72B is substantially offset. Therefore, by configuring the third lens 72C with a glass lens in which thermal deformation hardly occurs, it is possible to easily maintain a desired optical characteristic as the projection lens 72.

In the first embodiment, it has been described that, in order to make it possible to form the road surface drawing light distribution pattern PA on the road surface in front of the vehicle in a state where the lamp unit 10 faces the front direction of the vehicle, the central axis Ax1 of the spatial light modulator 30 is displaced upward with respect to the optical axis Ax of the projection lens 72. However, it is possible to adopt a configuration in which the central axis Ax1 and the optical axis Ax coincide with each other.

In the first embodiment, the lamp unit 10 has been described as an in-vehicle lamp unit, but it is possible to use for usages other than the in-vehicle lamp unit (e.g., usage such as a street light unit configured to draw from a direction immediately above the road surface).

Next, Modification of the first embodiment will be described.

Figure 9:
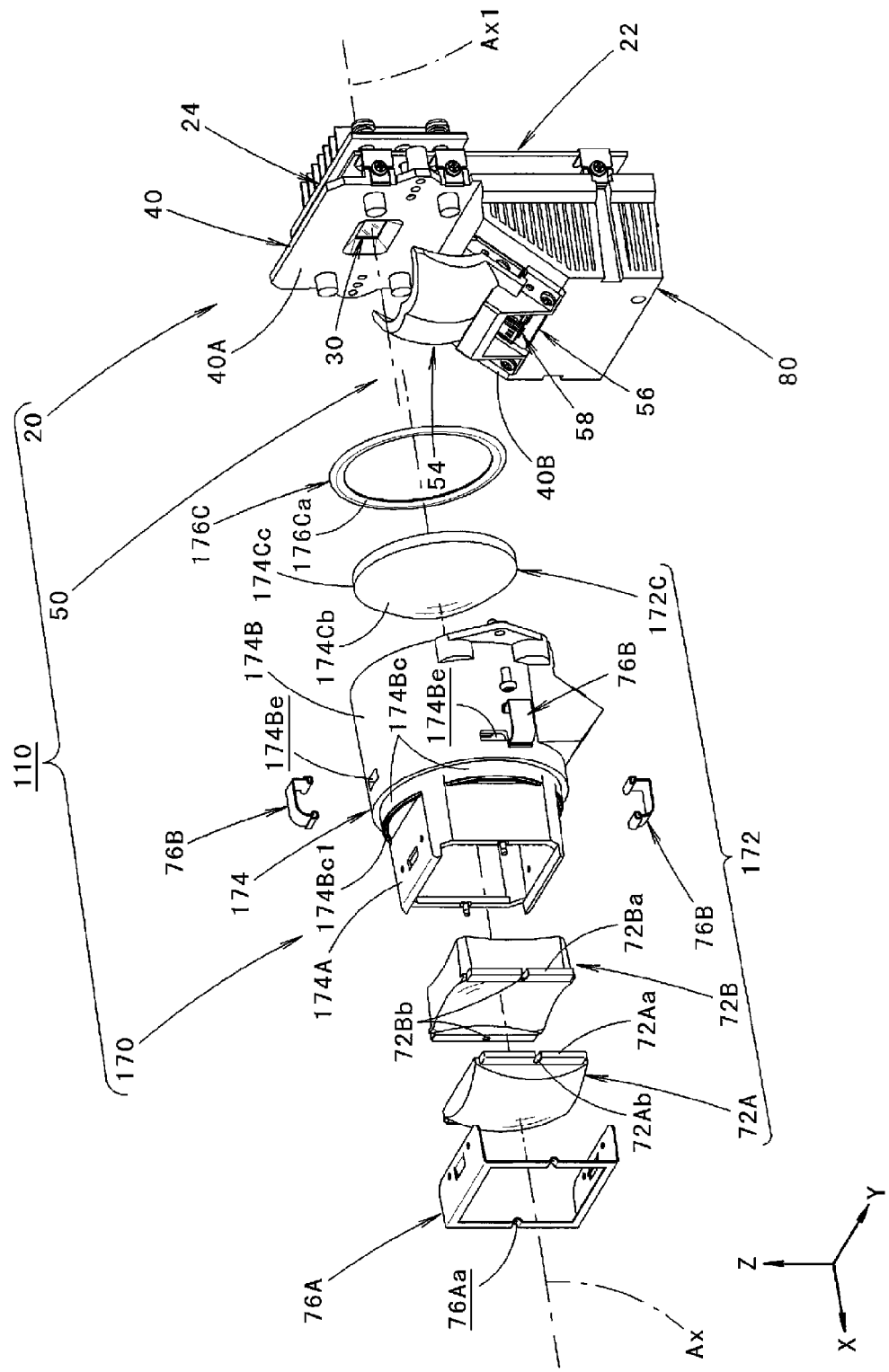
FIG. 9 is a view illustrating Modification of the first embodiment, which is similar to FIG. 4.
Figure 10:
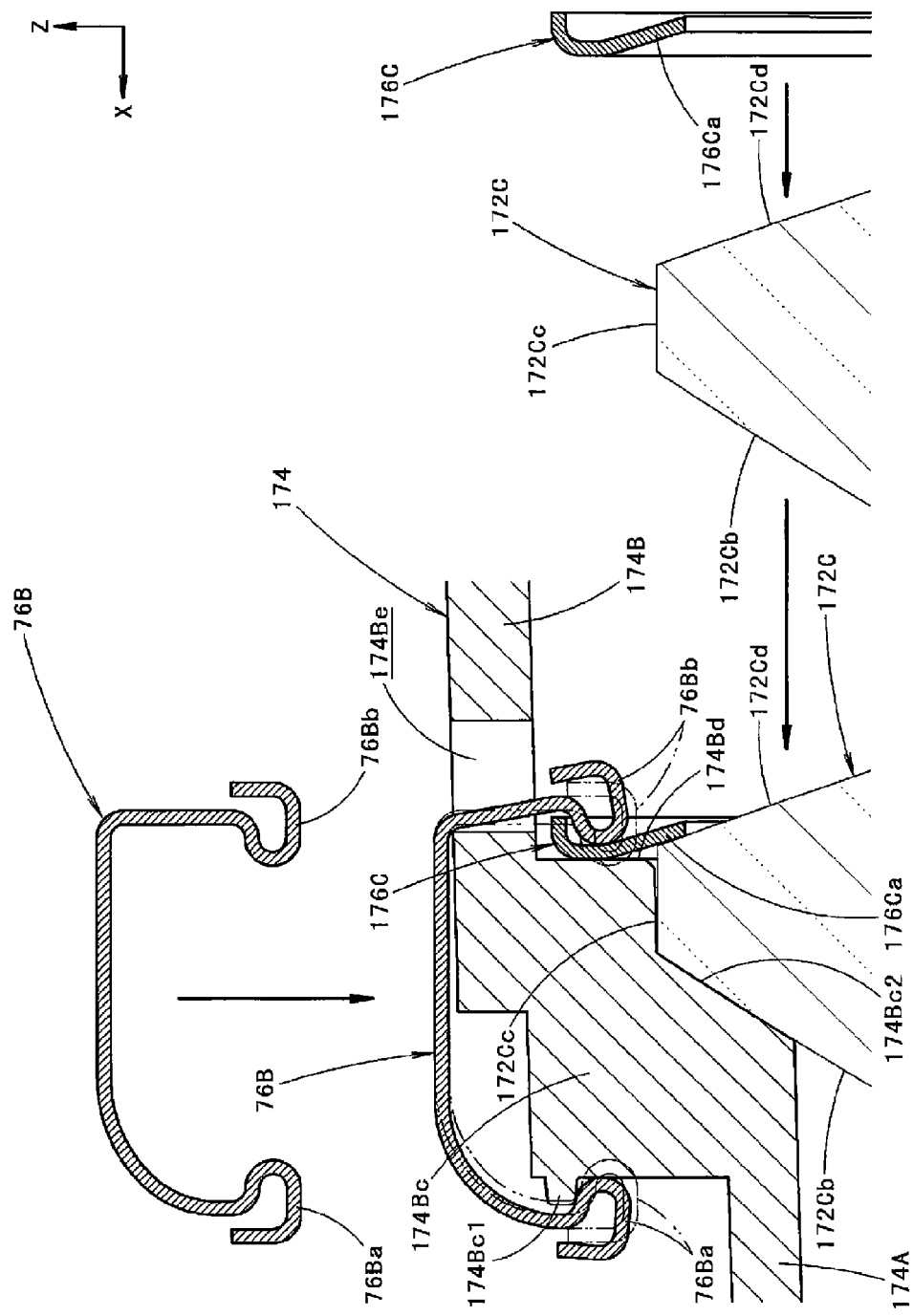
FIG. 10 is a view illustrating Modification, which is similar to FIG. 7.

FIGS. 9 and 10 are views illustrating a lamp unit 110 according to Modification, which are similar to FIGS. 4 and 7.

As illustrated in FIG. 9, the basic configuration of Modification is similar to the case of the first embodiment, but the configuration of a lens-side sub-assembly 170 is partially different from the case of the first embodiment.

That is, the lens-side sub-assembly 170 of Modification also includes a projection lens 172 having the optical axis Ax that extends in the front-rear direction of the unit and a lens holder 174 that supports the projection lens 172, and is supported by the bracket 40 at the rear end portion of the lens holder 174. However, the configuration of the projection lens 172 is partially different from the case of the first embodiment. As a consequence, the configurations of the lens holder 174 and a second metal fitting 176C are partially different from the case of the first embodiment.

Specifically, in the projection lens 172, among the first lens 72A, the second lens 72B and a third lens 172C that constitute the projection lens 172, the shape of the third lens 172C located on the rear most side of the unit is partially different from the case of the first embodiment.

That is, in this Modification, the third lens 172C is constituted by a glass lens, but a portion corresponding to the outer peripheral flange portion 72Ca like the third lens 72C of the first embodiment is not formed in the outer peripheral edge portion.

The third lens 172C has a circular outer peripheral shape larger than the first lens 72A and the second lens 72B when viewed from the front of the unit, and specifically, has a circular outer peripheral shape similar to the circumscribed circle of the first lens 72A and the second lens 72B.

Similarly to the case of the first embodiment, in the lens holder 174, a front region 174A thereof is formed to extend in a prismatic shape about the optical axis Ax, and a rear region 174B thereof is formed to extend in a cylindrical shape about the optical axis Ax. However, a front end portion of the rear region 174B is partially different from the case of the first embodiment.

That is, as illustrated in FIG. 10, in the rear region 174B of the lens holder 174, an annular surface 174Bd having an annular shape about the optical axis Ax is formed at the front end position. The annular surface 174Bd is located in the outer peripheral side from the third lens 172C and is located in the rear side of the unit from the annular surface 74Bd formed in the lens holder 74 of the first embodiment.

In this Modification, an outer peripheral protruding portion 174Bc that protrudes in an arc shape toward the outer peripheral side from the front region 174A is formed at four locations located above and below and at the left and the right with respect to the optical axis Ax at the front end portion of the rear region 174B of the lens holder 174. Then, on a front surface of each outer peripheral protruding portion 174Bc, a protrusion 174Bc1 having a flange shape extending in an arc shape along the outer peripheral end portion is formed.

A rear surface 174Bc2 of each outer peripheral protruding portion 174Bc has a surface shape along a front surface 172Cb and an outer peripheral surface 172Cc of the third lens 172C, so as to support the third lens 172C from the front side and the outer peripheral side of the unit in a state of being positioned.

The third lens 172C is supported by the lens holder 174 by attaching the four clips 76B from the outer peripheral side of the third lens 172C in a state where the second metal fitting 176C is pressed against to the annular surface 174Bd of the rear region 174B and the outer peripheral edge portion of a rear surface 172Cd of the third lens 172C from the rear side of the unit.

The second metal fitting 176C is constituted by a metal plate that extends in an annular shape with a substantially L shape cross-sectional shape, and an inner peripheral edge portion 176Ca thereof is formed to obliquely extend in the rear side of the unit. Then, when the second metal fitting 176C is pressed against the annular surface 174Bd of the rear region 174B, the inner peripheral edge portion 176Ca is pressed against the outer peripheral edge portion of the rear surface 172Cd of the third lens 172C.

The four clips 76B are attached by sandwiching the rear surface of the second metal fitting 176C pressed against the annular surface 174Bd of the rear region 174B and the outer peripheral edge portion of the rear surface 172Cd of the third lens 172C and the front surface of each outer peripheral protruding portion 174Bc by each clip 76B.

In this Modification, in the rear region 174B of the lens holder 174, a rectangular through hole 174Be is formed. The through hole 174Be is formed at three locations (specifically, three locations located immediately above and both left and right sides with respect to the optical axis Ax) in the outer peripheral surface in the vicinity of the front end portion in the circumferential direction.

Then, at these three locations, the front end portion 76Ba of each clip 76B is locked to the protrusion 174Bc1 of each outer peripheral protruding portion 174Bc, and the rear end portion 76Bb thereof is locked to the second metal fitting 176C in a state of being inserted into each through hole 174Be.

The clip 76B is attached in the same manner as the case of the first embodiment at the remaining one location.

Also when adopting the configuration of this Modification, the same operation effect as in the case of the first embodiment may be obtained.

Second Embodiment

Next, a second embodiment of the present disclosure will be described. The same reference numerals are given to the configurations common to those of the first embodiment, and detailed description thereof will be omitted.

Figure 11:
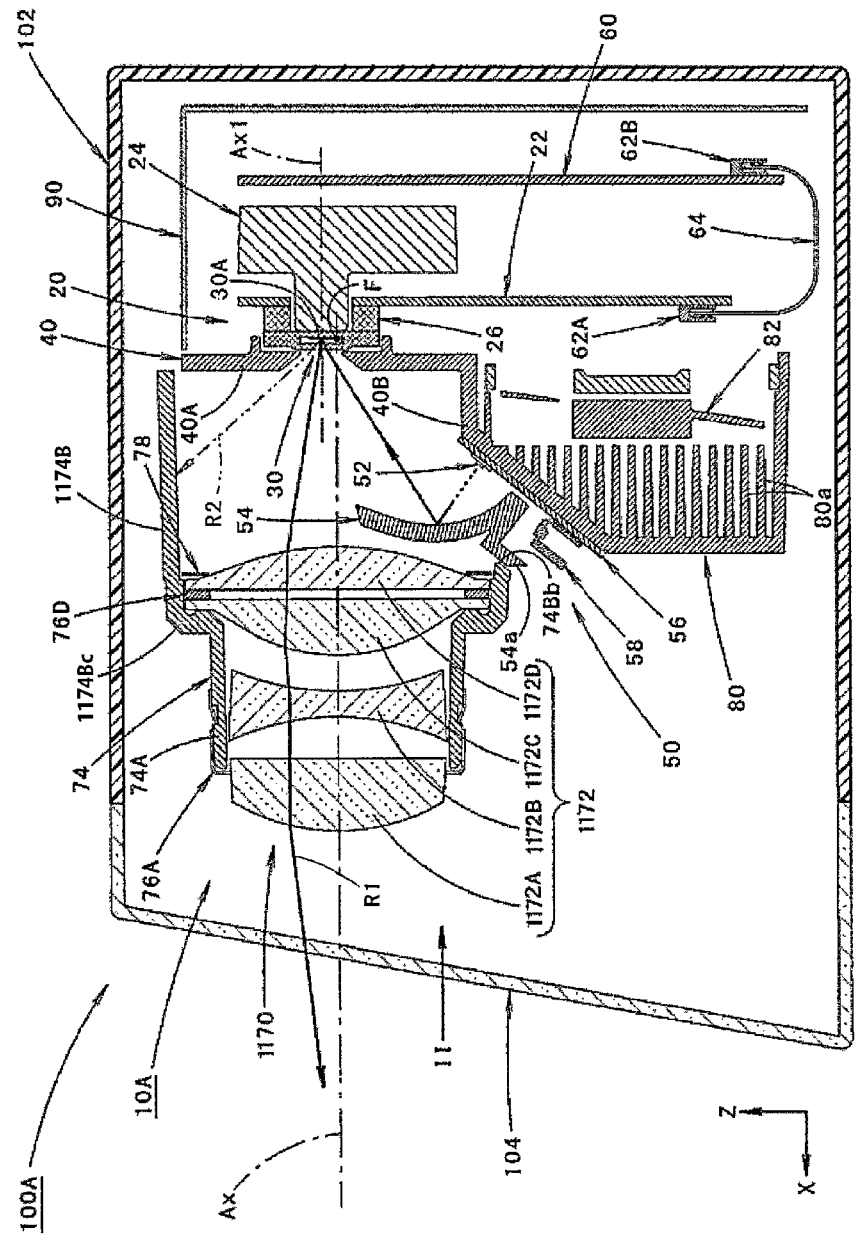
FIG. 11 is a vertical cross-sectional view illustrating a vehicle lamp including a lamp unit according to a second embodiment of the present disclosure.
Figure 12:
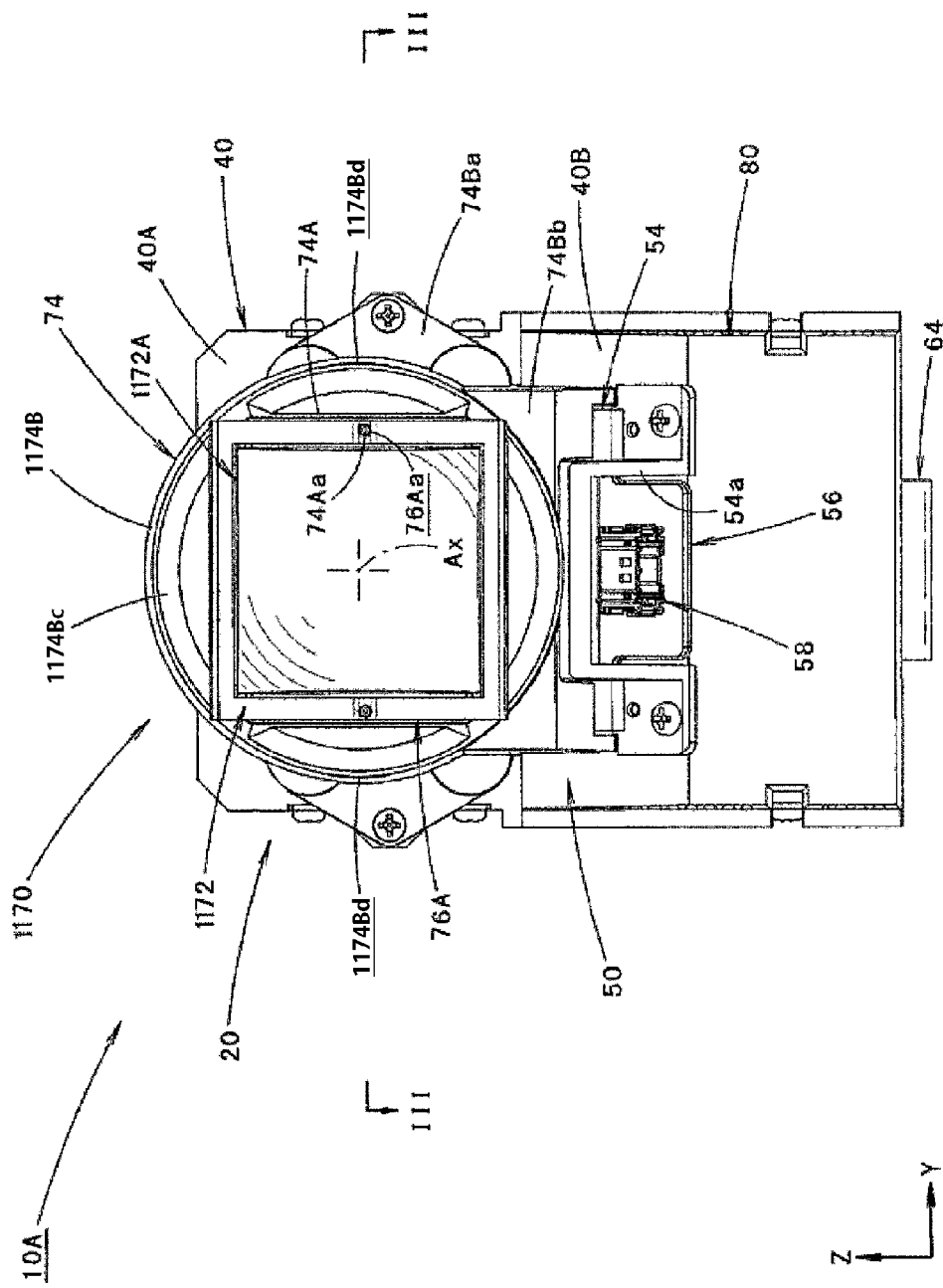
FIG. 12 is a front view illustrating the lamp unit viewed from the direction II in FIG. 1.
Figure 13:
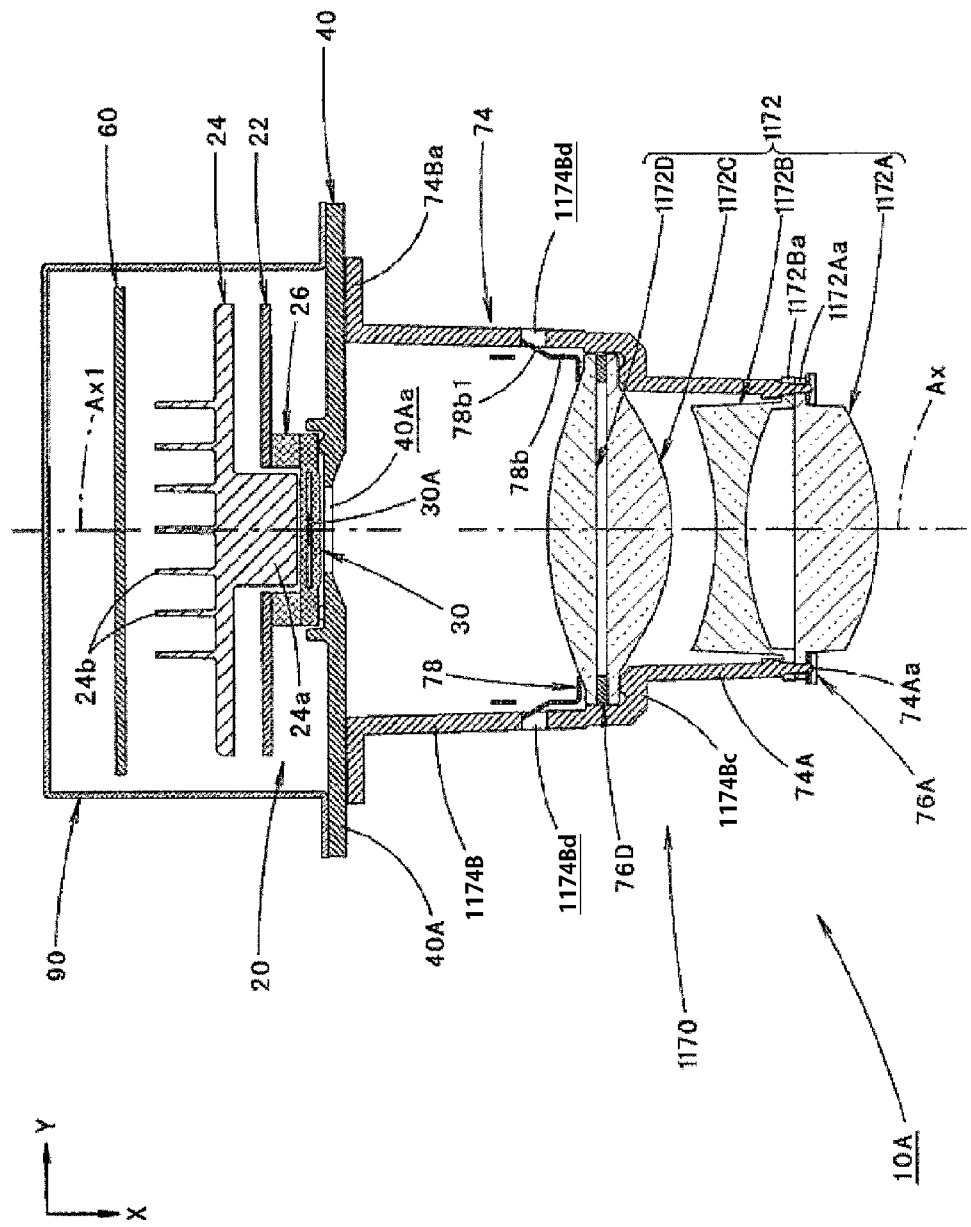
FIG. 13 is a cross-sectional view taken along line III-III in FIG. 12.
Figure 14:
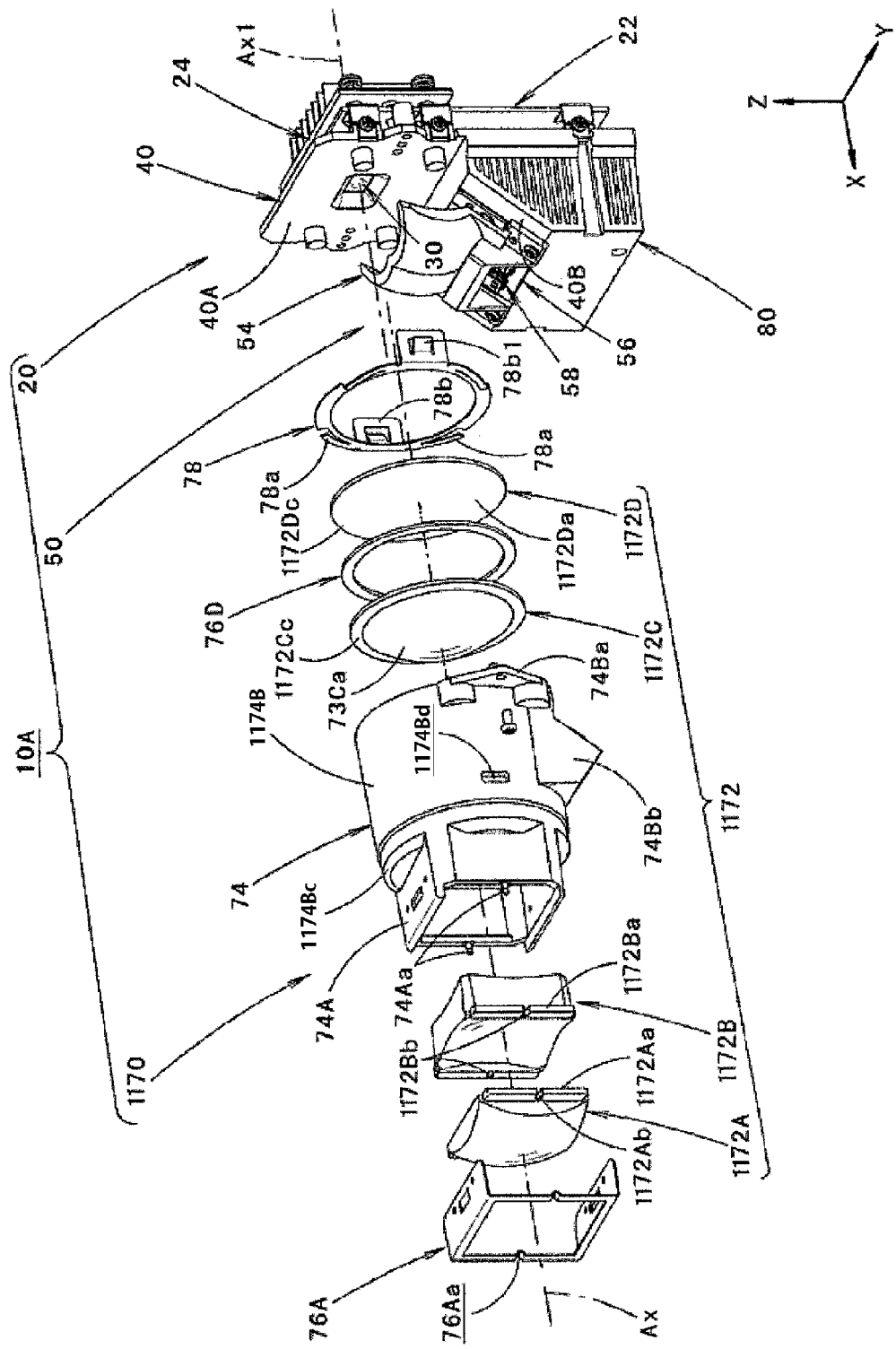
FIG. 14 is a perspective view illustrating the lamp unit by exploding into main components.

FIG. 11 is a side cross-sectional view illustrating a vehicle lamp 100A including a lamp unit 10A according to the second embodiment of the present disclosure. Further, FIG. 12 is a front view illustrating the lamp unit 10A when viewed from a direction II in FIG. 11, and FIG. 13 is a cross-sectional view taken along line III-III in FIG. 12. Further, FIG. 14 is a perspective view illustrating the lamp unit 10A by exploding into main components.

The vehicle lamp 100A is a road surface drawing lamp provided at the front end portion of a vehicle, and is configured such that the lamp unit 10A is accommodated in the lamp chamber formed by the lamp body 102 and the light transmitting cover 104 in a state where an optical axis is adjusted so that the front-rear direction of the lamp unit 10A (i.e., the front-rear direction of the unit) coincides with the front-rear direction of the vehicle.

The lamp unit 10A is configured to include the spatial light modulation unit 20, the light source-side sub-assembly 50, a lens-side sub-assembly 1170, and the bracket 40 that supports them.

On the lower side of the shelf-shaped portion 40B of the bracket 40 of the second embodiment, the heat sink 80 and the cooling fan 82 are disposed to dissipate heat generated by turn-on of each light source 52. The heat sink 80 is integrally formed with the bracket 40, and includes a plurality of heat radiation fins 80a that extends toward the rear of the unit. The cooling fan 82 is disposed in the rear side of the unit from the plurality of heat radiation fins 80a.

The lamp unit 10A according to the second embodiment may be configured to form a light distribution pattern (i.e., road surface drawing light distribution pattern) that draws a character or a symbol on the road surface in front of the vehicle by irradiating light from each light source 52 reflected by the reflector 54 toward the front of the unit through the spatial light modulator 30 and the projection lens 1172.

In order to implement this, the lamp unit 10A is configured to include the control substrate 60 to which a control circuit (not illustrated) that controls the spatial light modulator 30 based on a video signal from an in-vehicle camera (not illustrated) is mounted. The configuration of the control substrate 60 is equal to that of the first embodiment.

Figure 15:
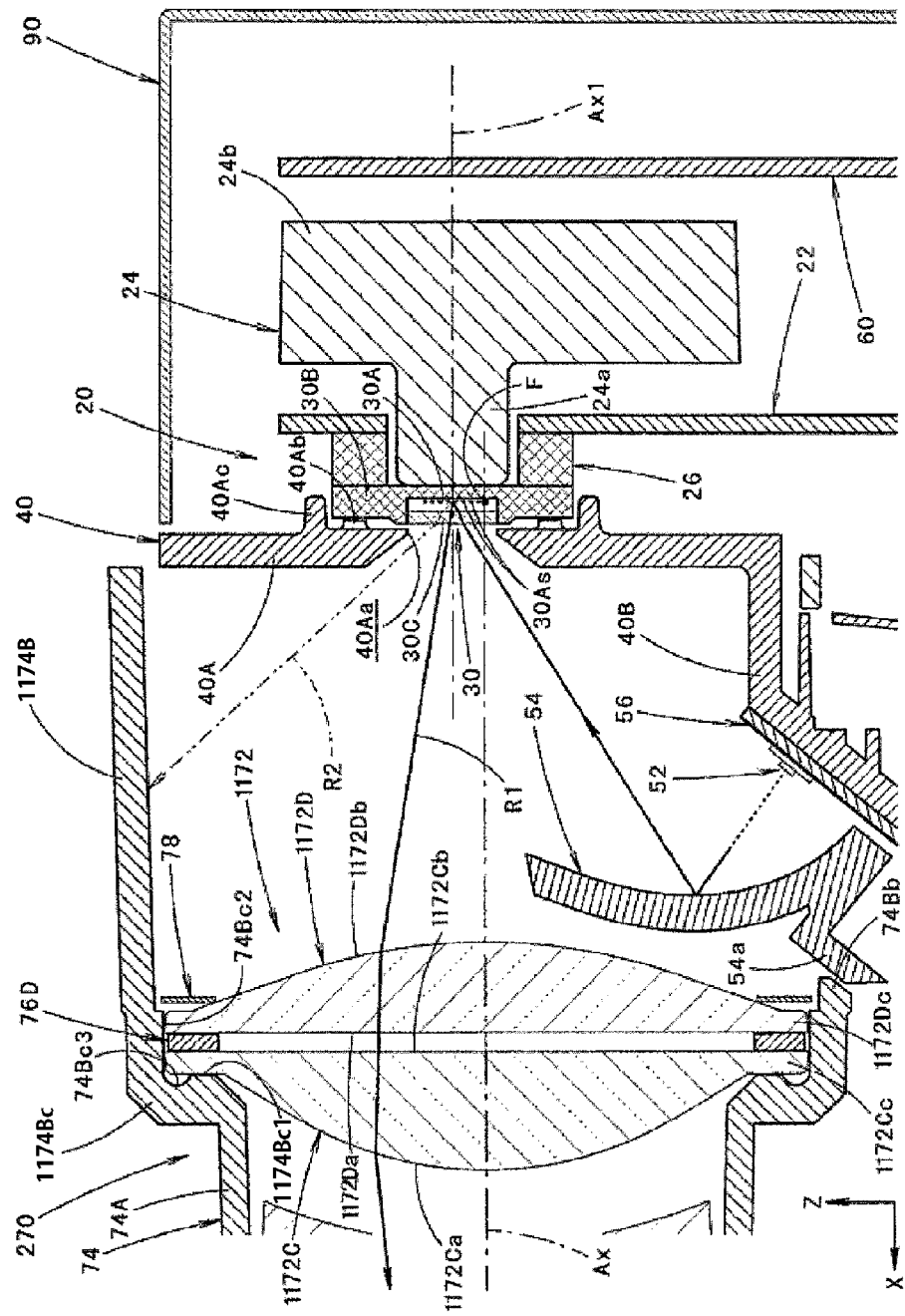
FIG. 15 is a view illustrating a detail of a main portion in FIG. 11.

FIG. 15 is a view illustrating a detail of a main portion in FIG. 11.

As illustrated in FIG. 15, the spatial light modulator 30 is a digital micro mirror device (DMD), and is configured to include the reflection controller 30A in which a plurality of reflection elements (specifically, hundreds of thousands of fine mirrors) 30As is disposed, the housing portion 30B that accommodates the reflection controller 30A, and the translucent plate 30C supported by the housing portion 30B in a state of being disposed in the front side of the unit from the reflection controller 30A. The reflection element 30As is an example of a light emitting control element. The configuration of the reflection controller 30A of the spatial light modulator 30 is similar to that of the first embodiment illustrated in FIG. 6.

Next, the specific configuration of the lens-side sub-assembly 1170 will be described.

As illustrated in FIGS. 11 to 14, the projection lens 1172 is constituted by total four of a first lens 1172A, a second lens 1172B, a third lens 1172C, and a fourth lens 1172D disposed side by side in the front-rear direction of the unit on the optical axis Ax.

The first lens 1172A located on the foremost side of the unit is configured as a plano-convex lens having a convex-curved surface that bulges toward the front of the unit, the second lens 1172B that is the second from the front side of the unit is configured as a biconcave lens, the third lens 1172C that is the third from the front side of the unit is configured as a plano-convex lens having a convex-curved surface that bulges toward the front of the unit, and the fourth lens 1172D that is located on the rearmost side of the unit is configured as a plano-convex lens having a convex-curved surface that bulges toward the rear of the unit. The third lens 1172C is an example of the second plano-convex lens, and the fourth lens 1172D is an example of the first plano-convex lens.

The first lens 1172A is constituted by a resin lens (specifically, acrylic resin lens), the second lens 1172B is constituted by a resin lens (specifically, polycarbonate resin lens), and the third lens 1172C and the fourth lens 1172D are constituted by a glass lens.

The first lens 1172A and the second lens 1172B have a rectangular (specifically, square) outer peripheral shape having substantially the same size when viewed from the front of the unit. The third lens 1172C and the fourth lens 1172D have a circular outer peripheral shape larger than the first lens 1172A and the second lens 1172B when viewed from the front of the unit, and specifically, have a circular outer peripheral shape slightly larger than a circumscribed circle of the first lens 1172A and the second lens 1172B.

The first lens 1172A to the fourth lens 1172D are supported by the common lens holder 74.

The lens holder 74 is a metal member (e.g., made of aluminum die-cast). The front region 74A thereof is formed to extend in a prismatic shape about the optical axis Ax, and the rear region 1174B thereof is formed to extend in a cylindrical shape about the optical axis Ax.

The pair of left and right flange portions 74Ba is formed at the rear end portion of the lens holder 74. Then, the lens holder 74 is fixed to the vertical surface portion 40A of the bracket 40 at each flange portion 74Ba by screwing.

The lower end portion of the rear region 1174B of the lens holder 74 is cut out, and the downward protruding portion 74Bb that protrudes downward is formed around the lower end portion of the rear region 1174B.

The downward protruding portion 74Bb has a lower surface shape that conforms the horizontal plane shape and the inclined surface shape of the shelf-shaped portion 40B of the bracket 40 and the outer peripheral surface shape of the mounting leg portion 54a of the reflector 54. Then, the lens holder 74 is configured to be fixed to the vertical surface portion 40A of the bracket 40 in a state where the downward protruding portion 74Bb is placed on the shelf-shaped portion 40B of the bracket 40. Therefore, the lens holder 74 is configured to be disposed in a state where the space between the bracket 40 and the projection lens 1172 is sealed.

The metal fitting 76A is attached to the lens holder 74 from the front side of the unit. Therefore, the first lens 1172A and the second lens 1172B are fixed to the lens holder 74.

On an outer peripheral edge portion of the first lens 1172A and the second lens 1172B, a pair of left and right outer peripheral flange portions 1172Aa and 1172Ba that extends in the vertical direction are formed, respectively.

Then, the first lens 1172A and the second lens 1172B are supported by the front end surface of the front region 74A with respect to the lens holder 74 in a state where the pair of left and right outer peripheral flange portions 1172Aa and 1172Ba is overlapped with each other.

At the front end surface of the front region 74A, the pair of left and right positioning pins 74Aa that extends toward the front of the unit are formed. Each positioning pin 74Aa is located slightly below the horizontal plane including the optical axis Ax.

In the pair of left and right outer peripheral flange portions 1172Aa and 1172Ba on each of the first lens 1172A and the second lens 1172B, a pair of left and right engaging portions 1172Ab and 1172Bb that engages with the pair of left and right positioning pins 74Aa of the lens holder 74 is formed. Among the pair of left and right engaging portions 1172Ab and 1172Bb, the engaging portions 1172Ab and 1172Bb located on the right side are formed as engaging holes, and the engaging portions 1172Ab and 1172Bb located on the left side are formed as engaging grooves.

Then, when the metal fitting 76A is attached to the lens holder 74, each of the first lens 1172A and the second lens 1172B is positioned in the vertical plane orthogonal to the optical axis Ax by engaging the engaging portions 1172Ab and 1172Bb of the pair of left and right outer peripheral flange portions 1172Aa and 1172Ba with the pair of left and right positioning pins 74Aa. In the metal fitting 76A, the pair of left and right inserting holes 76Aa configured to insert the pair of left and right positioning pins 74Aa is formed.

As illustrated in FIG. 15, in the third lens 1172C, the convex-curved surface that constitutes a front surface 1172Ca thereof is configured as an aspherical surface, and further, in the fourth lens 1172D, the convex-curved surface that constitutes a rear surface 1172Db thereof is configured as an aspherical surface. The convex-curved surface that constitutes a front surface 1172Ca of the third lens 1172C is formed to have a larger curvature than the convex-curved surface that constitutes the rear surface 1172Db of the fourth lens 1172D.

On an outer peripheral edge portion of the third lens 1172C, an outer peripheral flange portion 1172Cc having a constant width is formed over the entire circumference of the outer peripheral edge portion. On an outer peripheral edge portion of the fourth lens 1172D, an outer peripheral flange portion 1172Dc having a constant width is formed over the entire circumference of the outer peripheral edge portion. The third lens 1172C and the fourth lens 1172D have the same outer shape.

A spacer 76D made of metal and formed in an annular shape is disposed between a plane that constitutes a rear surface 1172Cb of the third lens 1172C and a plane that constitutes a front surface 1172Da of the fourth lens 1172D.

The lens holder 74 supports the third lens 1172C and the fourth lens 1172D in a state of being positioned, at the front end portion 1174Bc of the rear region 1174B.

That is, on the inner surface side of the front end portion 1174Bc, the annular surface 1174Bc1 that extends in an annular shape about the optical axis Ax along the vertical plane orthogonal to the optical axis Ax, and a cylindrical surface 74Bc2 that extends in the front-rear direction about the optical axis Ax are formed. Further, in a connection portion between the annular surface 1174Bc1 and the cylindrical surface 74Bc2, an annular groove portion 74Bc3 that extends along the 1174Bc1 is formed.

Then, the third lens 1172C and the fourth lens 1172D are accommodated in the cylindrical surface 74Bc2 from the rear side of the unit in a state where the spacer 76D is sandwiched between the outer peripheral flange portions 1172Cc and 1172Dc. The outer peripheral flange portion 1172Cc of the third lens 1172C abuts on the annular surface 1174Bc1 of the lens holder 74 from the rear side of the unit, and the outer peripheral flange portion 1172Dc of the fourth lens 1172D is elastically pressed toward the front side of the unit by the leaf spring 78, and thus, the third lens 1172C and the fourth lens 1172D are positioned with respect to the lens holder 74.

As illustrated in FIG. 14, the leaf spring 78 is formed to extend in an annular shape about the optical axis Ax. Then, an elastic pressing portion 78a is formed at four locations of the leaf spring 78 in the circumferential direction, and a locking portion 78b is formed at two locations on the left and right sides of the leaf spring 78.

The elastic pressing portions 78a at four locations are formed in a symmetrical arrangement and shape with respect to the vertical plane including the optical axis Ax. Each elastic pressing portion 78a is formed to extend in a band shape in the circumferential direction by cutting a part of the leaf spring 78 diagonally toward the front side of the unit.

The locking portions 78b at two locations are formed in a symmetrical arrangement and shape with respect to the vertical plane including the optical axis Ax. Each locking portion 78b is formed by folding the outer peripheral edge portion of the leaf spring 78 toward the rear side of the unit. In the central portion of each locking portion 78b, a cut portion 78b1 cut up in a direction away from the optical axis Ax toward the rear of the unit is formed.

Meanwhile, a through hole 1174Bd is formed at two locations in the portion in the vicinity of the front end of the rear region 1174B of the lens holder 74. Each through hole 1174Bd is formed in a vertically long rectangular shape on both the left and right sides of the optical axis Ax.

Then, in the leaf spring 78, the cut portions 78b1 of the pair of left and right locking portions 78b are configured to be locked to the pair of left and right through holes 1174Bd of the lens holder 74. At this time, the leaf spring 78 is elastically deformed in a state where the elastic pressing portions 78a at four locations abut on the outer peripheral flange portion 1172Dc of the fourth lens 1172D from the rear side of the unit, thereby elastically pressing the fourth lens 1172D toward the front side of the unit together with the third lens 1172C and the spacer 76D.

Figure 16:
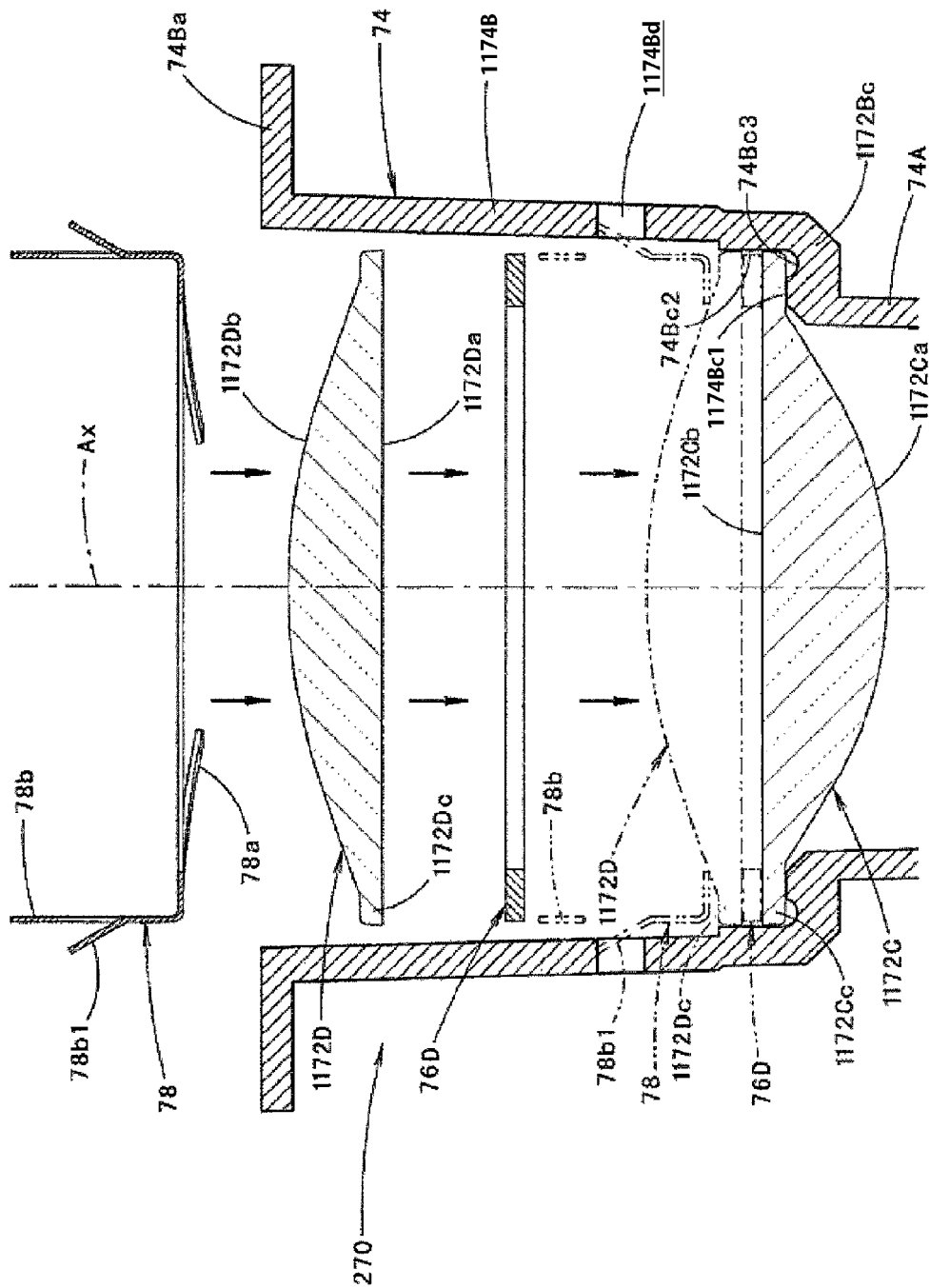
FIG. 16 is a view illustrating a state when a lens-side sub-assembly of the lamp unit is assembled, which is substantially similar to FIG. 13.

FIG. 16 is a view illustrating a state when the lens-side sub-assembly 1170 of the lamp unit 10A is assembled, which is substantially similar to FIG. 13.

As illustrated in FIG. 16, firstly, the third lens 1172C is inserted from the rear side of the unit into the inner space of the rear region 1174B of the lens holder 74, and the outer peripheral flange portion 1172Cc thereof abuts on the annular surface 1174Bc1 in the cylindrical surface 74Bc2 of the lens holder 74.

Next, the spacer 76D is inserted from the rear side of the unit into the inner space of the rear region 1174B of the lens holder 74 so as to abut on the rear surface 1172Cb of the third lens 1172C. Next, the fourth lens 1172D is inserted from the rear side of the unit into the inner space of the rear region 1174B, and the front surface 1172Da of the fourth lens 1172D abuts on the spacer 76D.

Thereafter, the leaf spring 78 is inserted from the rear side of the unit into the inner space of the rear region 1174B of the lens holder 74, and the cut portions 78b1 of the pair of left and right locking portions 78b are locked to the pair of left and right through holes 1174Bd of the lens holder 74. At this time, the leaf spring 78 is elastically deformed in a state where the elastic pressing portions 78a at four locations abut on the outer peripheral flange portion 1172Dc of the fourth lens 1172D from the rear side of the unit.

Therefore, the third lens 1172C and the fourth lens 1172D are positioned in the cylindrical surface 74Bc2 of the lens holder 74 in a state where the spacer 76D is sandwiched between them.

Similarly to the first embodiment, the optical axis Ax of the projection lens 1172 is displaced downward with respect to the central axis Ax1 of the reflection controller 30A of the spatial light modulator 30. Therefore, the light that reaches the projection lens 1172 from the reflection controller 30A is irradiated from the projection lens 1172 toward the front of the unit as slightly downward light with respect to the horizontal direction, and thus, a road surface drawing light distribution pattern is formed on the road surface in front of the vehicle.

A view that transparently illustrates a light distribution pattern formed on a virtual vertical screen disposed at a position 25 m away from the front of the vehicle by an irradiation light from the vehicle lamp 100A is similar to the first embodiment (FIG. 8).

Similarly to the first embodiment, the road surface drawing light distribution pattern PA is formed by directing the reflected light from a part of the plurality of reflection elements 30As (e.g., reflection elements 30As located in the region set by the arrow shape) that constitute the reflection controller 30A of the spatial light modulator 30 toward the projection lens 1172.

When the vehicle is traveling at night, by forming the road surface drawing light distribution pattern PA of the arrow shape, for example, the surrounding is notified that the vehicle is approaching an intersection in front of the vehicle to call attention.

Next, an operation of the second embodiment will be described.

The lamp unit 10A according to the second embodiment is configured to irradiate light from the light source 52 reflected by the spatial light modulator 30 including a plurality of reflection elements 30As disposed in a matrix shape (i.e., light from a plurality of light emitting control elements disposed in a matrix shape) toward the front of the unit through the projection lens 1172, and thus, may form various road surface drawing light distribution patterns PA by controlling the spatial distribution of the reflected light in the spatial light modulator 30.

At this time, since the projection lens 1172 is constituted by total four of the first lens 1172A, the second lens 1172B, the third lens 1172C, and the fourth lens 1172D disposed side by side in the front-rear direction, and the plurality of lenses are supported by the common lens holder 74, the accuracy of the positional relationship between the lenses may be sufficiently secured, and thus, a desired optical characteristic may be easily obtained.

Additionally, in the four lenses of the first lens 1172A to the fourth lens 1172D, since the fourth lens 1172D located on the rearmost side of the unit is configured as the plano-convex lens (first plano-convex lens) having the convex-curved surface that bulges toward the rear of the unit, and the third lens 1172C adjacent to the unit front side of the fourth lens 1172D is configured as the plano-convex lens (second plano-convex lens) having the convex-curved surface that bulges toward the front of the unit, it is possible to have a lens function substantially the same as the case where the lens located on the rearmost side of the unit is configured as a biconvex lens.

Further, by adopting the third lens 1172C (second plano-convex lens) and the fourth lens 1172D (first plano-convex lens) instead of a biconvex lens, the manufacturing cost may be reduced.

That is, in the second embodiment, although the third lens 1172C and the fourth lens 1172D are constituted by a glass lens, it is sufficient to mold the lens surface on the convex-curved surface side, that is, the front surface 1172Ca of the third lens 1172C and the rear surface 1172Db of the fourth lens 1172D using a molding, and thus, the lenses may be easily manufactured with high accuracy.

As described above, according to the second embodiment, in the lamp unit 10A configured to irradiate the reflected light from a plurality of reflection elements 30As disposed in a matrix shape toward the front of the unit through the projection lens 1172, the optical characteristic of the projection lens 1172 may be maintained while reducing the costs.

Particularly, in the second embodiment, since the fourth lens 1172D is constituted by a glass lens, the following operation effects may be obtained.

That is, the fourth lens 1172D located on the rearmost side of the unit is likely to be affected due to radiant heat generated by the reflected light from a plurality of reflection elements 30As or heat generated in the vicinity of the light source 52 and accumulated in the inner space of the lens holder 74, but it is possible to prevent thermal deformation from occurring in advance by configuring the fourth lens 1172D using a glass lens. Then, therefore, it is possible to improve the effect of maintaining the optical characteristic of the projection lens 1172.

Further, in the second embodiment, since the third lens 1172C is also constituted by a glass lens, it is possible to further improve the effect of maintaining the optical characteristic of the projection lens 1172.

Further, in the second embodiment, since the annular-shaped spacer 76D is disposed between the third lens 1172C and the fourth lens 1172D, the following operation effects may be obtained.

That is, when the projection lens 1172 is configured such that the third lens 1172C and the fourth lens 1172D are disposed in a state of being in direct surface contact with each other, when a vibration load or the like acts on the lamp unit 10A, the third lens 1172C and the fourth lens 1172D may rub against each other, which may cause damage on the lens surface.

In contrast, since the annular-shaped spacer 76D is disposed between the third lens 1172C and the fourth lens 1172D, it is possible to prevent the damage on the lens surface from occurring in advance in a state where the positional relationship between the third lens 1172C and the fourth lens 1172D is maintained.

That is, as the projection lens, it is possible to adopt the configuration in which the fourth lens 1172D and the third lens 1172C are disposed in a state of being in direct surface contact with each other. However, in such as case, when a vibration load or the like acts on the lamp unit, the fourth lens 1172D and the third lens 1172C may rub against each other, which may cause damage on the lens surface.

In contrast, since the annular-shaped spacer 76D is disposed between the fourth lens 1172D and the third lens 1172C, it is possible to prevent the damage on the lens surface from occurring in advance in a state where the positional relationship between the the fourth lens 1172D and the third lens 1172C is maintained.

Further, in the second embodiment, the through hole 1174Bd is formed at two locations of the lens holder 74 in the circumferential direction, and further, the leaf spring 78 that elastically presses the fourth lens 1172D toward the front side of the unit in a state of being locked to the through holes 1174Bd at two locations is disposed at positions in the rear side of the unit from the fourth lens 1172D in the inner space of the lens holder 74. Therefore, the third lens 1172C and the fourth lens 1172D may be reliable positioned with respect to the front-rear direction of the unit.

Further, in the second embodiment, since the outer diameters of the third lens 1172C and the fourth lens 1172D are set to diameters (values) larger than the outer diameters of the first lens 1172A and the second lens 1172B, it becomes easier to prevent the influence of heat on the first lens 1172A and the second lens 1172B constituted by a resin lens.

Further, in the second embodiment, since the third lens 1172C and the fourth lens 1172D have a circular outer shape and the first lens 1172A and the second lens 1172B have a rectangular outer shape, the following operation effects may be obtained.

That is, by configuring the first lens 1172A and the second lens 1172B located in the front side of the unit to have a rectangular outer shape, it is possible to easily improve the design of the lamp unit 10A. At this time, since the first lens 1172A and the second lens 1172B are constituted by a resin lens, it is possible to easily configure to have a rectangular outer shape. Meanwhile, since the third lens 1172C and the fourth lens 1172D constituted by a glass lens have a circular outer shape, it may be easily manufactured, and thus, the cost of the lamp unit 10A may be reduced.

Further, since the third lens 1172C and the fourth lens 1172D are fixed to the lens holder 74 at a portion that protrudes to the outer peripheral side from the first lens 1172A and the second lens 1172B in the front end portion 1174Bc of the rear region 1174B of the lens holder 74, the positioning of the third lens 1172C and the fourth lens 1172D may be easily performed.

Further, the spatial light modulator 30 includes the plurality of reflection elements 30As that reflect light from the light source 52 as a plurality of light emitting control elements disposed in a matrix shape, and is configured as a digital micro mirror configured to selectively take the first angular position that reflects toward the projection lens 1172 and the second angular position that reflects in the direction deviated from the projection lens 1172 as an angular position of each reflection element 30As. Further, the lens holder 74 is constituted by a metal member, and is configured to block the reflected light from the reflection element 30As at the second angular position. As a result, since heat is easily transferred to the third lens 1172C and the fourth lens 1172D via the lens holder 74, it is particularly effective to adopt the configuration of the second embodiment.

Further, in the second embodiment, since the first lens 1172A and the second lens 1172B among the four lenses of the first lens 1172A to the fourth lens 1172D are constituted by a resin lens, the first lens 1172A is configured as a plano-convex lens, and the second lens 1172B is configured as a biconcave lens, even when some extent of heat deformation occurs, the change in optical characteristics between the first lens 1172A and the second lens 1172B is substantially offset. Therefore, by configuring the third lens 1172C and the fourth lens 1172D with a glass lens in which thermal deformation hardly occurs, it is possible to easily maintain a desired optical characteristic as the projection lens 1172.

In the second embodiment, it has been described that each of the third lens 1172C and the fourth lens 1172D is constituted by a glass lens, but these lenses may be constituted by a resin lens.

As described above, when each of the third lens 1172C and the fourth lens 1172D is constituted by a resin lens, the thickness of the central portion is substantially halved as compared with the case where the lenses are configured as one biconvex lens, and thus, a sink mark at the time of molding is not likely to occur. Therefore, the optical characteristic as the projection lens 1172 may be maintained while reducing the manufacturing cost of the third lens 1172C and the fourth lens 1172D.

In the second embodiment, it has been described that, in order to make it possible to form the road surface drawing light distribution pattern PA on the road surface in front of the vehicle in a state where the lamp unit 10A faces the front direction of the vehicle, the central axis Ax1 of the spatial light modulator 30 is displaced upward with respect to the optical axis Ax of the projection lens 1172. However, it is possible to adopt a configuration in which the central axis Ax1 and the optical axis Ax coincide with each other.

In the second embodiment, the lamp unit 10A has been described as an in-vehicle lamp unit, but it is possible to use for usages other than the in-vehicle lamp unit (e.g., usage such as a street light unit configured to draw from a direction immediately above the road surface).

Modification 1 of Second Embodiment

Next, Modification of the second embodiment will be described.

First, Modification 1 of the second embodiment will be described.

Figure 17:
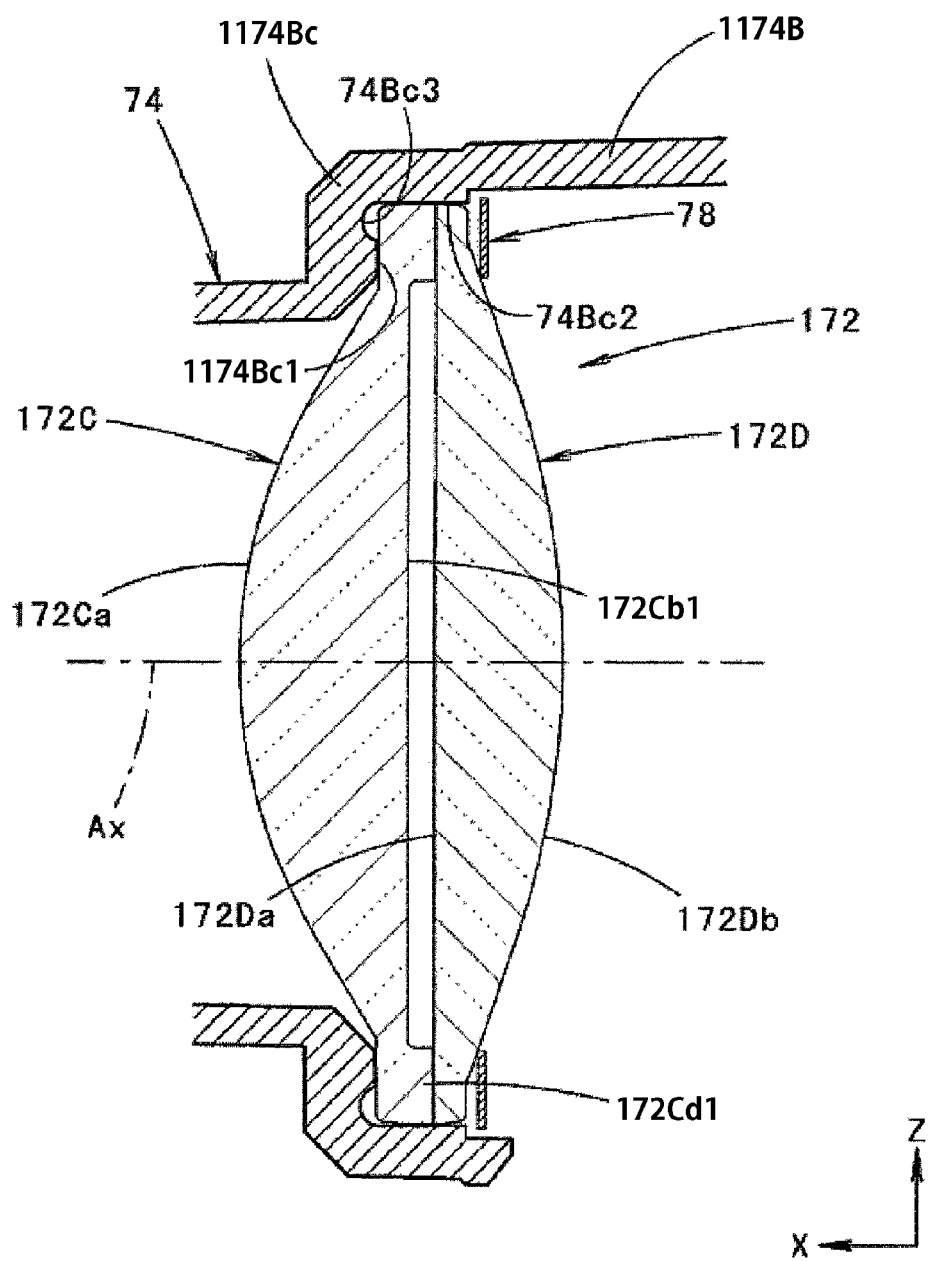
FIG. 17 is a view illustrating Modification 1 of the second embodiment, which is substantially similar to FIG. 15.

FIG. 17 is a view illustrating a main portion of a lamp unit according to this Modification, which is similar to FIG. 15.

As illustrated in FIG. 17, the basic configuration of this Modification is similar to the case of the second embodiment, but the configuration of the projection lens 172 is partially different from the case of the second embodiment.

That is, also in the projection lens 172 of this Modification, a fourth lens 172D located on the rearmost side of the unit is configured as a plano-convex lens (first plano-convex lens) having a rear surface 172Db on the convex-curved surface that bulges toward the rear of the unit, and a third lens 172C adjacent to the unit front side of the fourth lens 172D is configured as a plano-convex lens (second plano-convex lens) having a front surface 172Ca on the convex-curved surface that bulges toward the front of the unit. However, this Modification is different from the case of the second embodiment in that the third lens 172C is constituted by a resin lens.

Further, the projection lens 172 of this Modification is different from the case of the second embodiment in that a protrusion 172Cd1 is formed in an outer peripheral edge portion of a rear surface 172Cb1 of the third lens 172C. The protrusion 172Cd1 is formed as a flat plate-shaped protrusion that extends in an annular shape about the optical axis Ax. Then, a rear surface of the protrusion 172Cd1 abuts on a front surface 172Da of the fourth lens 172D, and thus, a distance between the third lens 172C and the fourth lens 172D is defined.

As a result, in this Modification, a member corresponding to the spacer 76D in the second embodiment does not exist.

The fourth lens 172D of this Modification has a configuration similar to that of the fourth lens 1172D of the second embodiment.

Also when adopting the configuration of this Modification, the same operation effect as in the case of the second embodiment may be obtained.

Additionally, by adopting the configuration of this Modification, it is possible to lighten the weight of the third lens 172C, and further improve the degree of freedom of the shape thereof.

Then, in this Modification, the protrusion 172Cd1 is integrally formed in the third lens 172C, the spacer 76D in the second embodiment may be abolished. Therefore, it is possible to prevent damage on the lens surface from occurring in advance in a state where the positional relationship between the third lens 172C and the fourth lens 172D is maintained.

Modification 2 of Second Embodiment

Next, Modification 2 of the second embodiment will be described.

Figure 18:
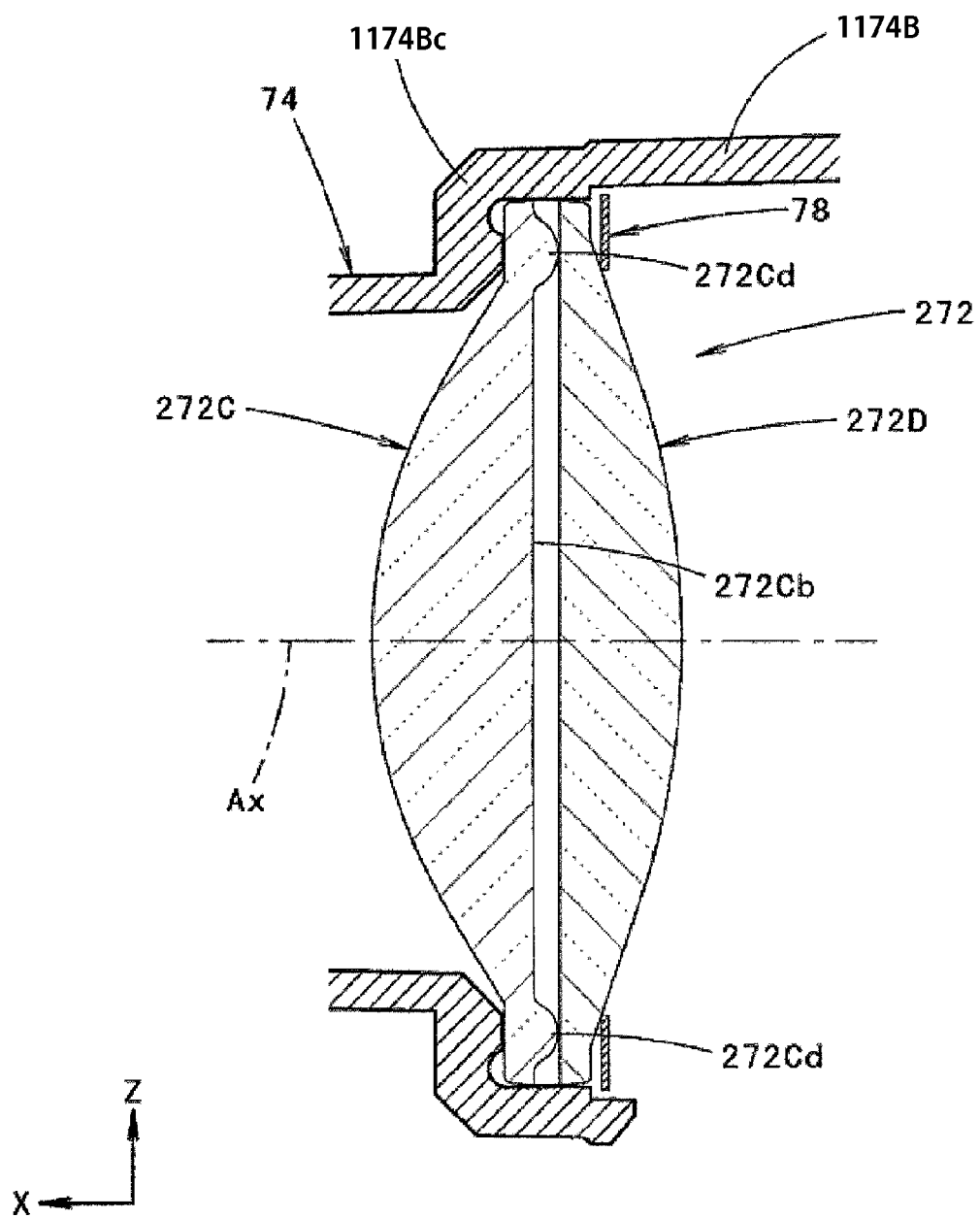
FIG. 18 is a view illustrating Modification 2 of the second embodiment, which is substantially similar to FIG. 15.

FIG. 18 is a view illustrating a main portion of a lamp unit according to Modification 2, which is similar to FIG. 15.

As illustrated in FIG. 18, similar to the projection lens 172 of Modification 1 of the second embodiment, also in a projection lens 272 of Modification 2, a third lens 272C is constituted by a resin lens, and a fourth lens 272D is constituted by a glass lens. The third lens 272C is an example of the second plano-convex lens, and the fourth lens 272D is an example of the first plano-convex lens.

Then, in this Modification, although a protrusion 272Cd is integrally formed in an outer peripheral edge portion of a rear surface 272Cb of the third lens 272C, the protrusion 272Cd in Modification 2 is formed as a hemispherical protrusion at a plurality of locations at an equal interval in the circumferential direction.

Also when adopting the configuration of this Modification, the same operation effect as in the case of Modification 1 of the second embodiment may be obtained.

Modification 3 of Second Embodiment

Next, Modification 3 of the second embodiment will be described.

Figure 19:
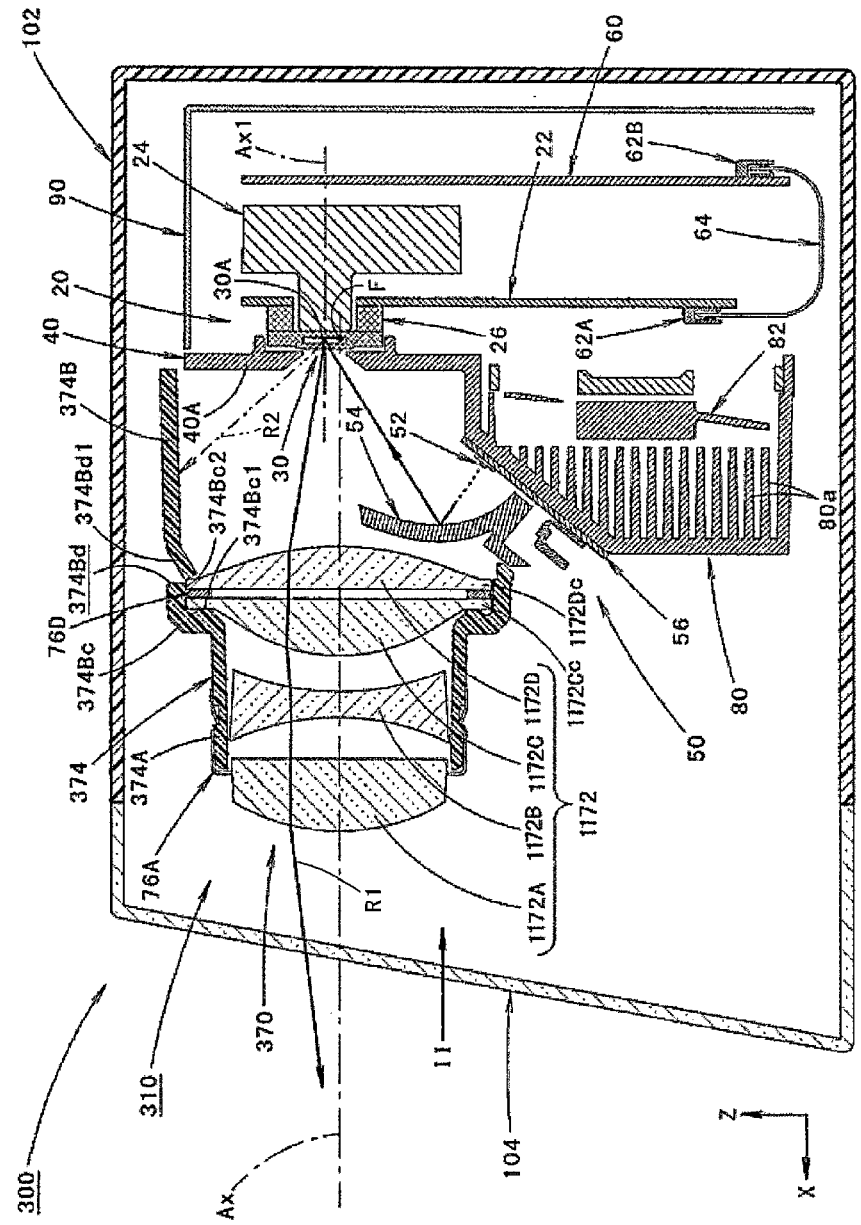
FIG. 19 is a view illustrating Modification 3 of the second embodiment, which is similar to FIG. 11.
Figure 20:
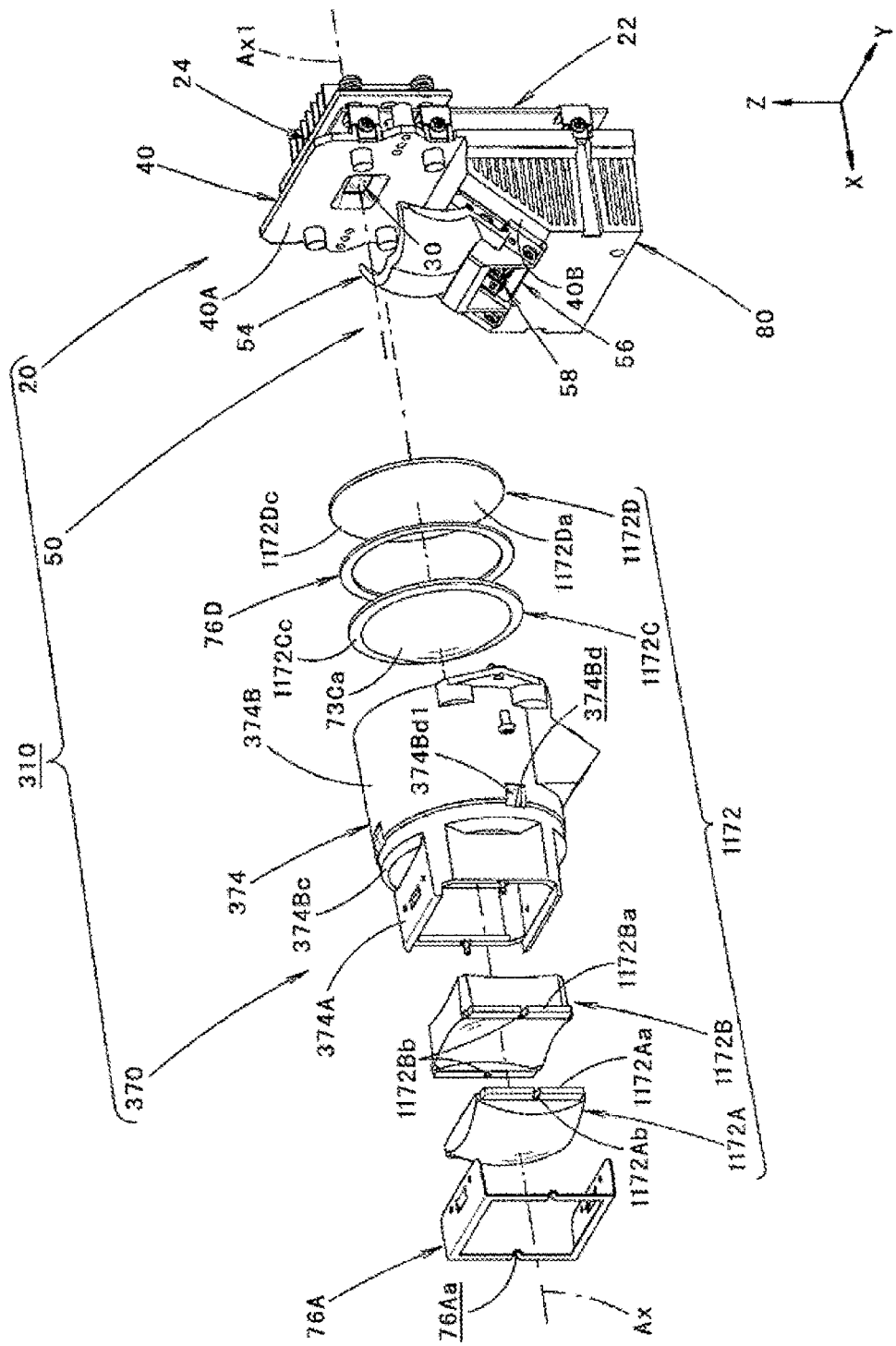
FIG. 20 is a view illustrating Modification 3, which is similar to FIG. 14.

FIG. 19 is a side cross-sectional view illustrating a vehicle lamp 300 including a lamp unit 310 according to this Modification, and FIG. 20 is a view illustrating the lamp unit 310 by exploding into main components, which is similar to FIG. 14.

As illustrated in FIGS. 19 and 20, the basic configuration of this Modification is similar to the case of the second embodiment, but the configuration of a lens-side sub-assembly 370 is partially different from the case of the embodiment. The third lens 1172C is an example of the second plano-convex lens, and the fourth lens 1172D is an example of the first plano-convex lens.

That is, the lens-side sub-assembly 370 of this Modification also includes the projection lens 1172 having the optical axis Ax that extends in the front-rear direction of the unit and a lens holder 374 that supports the projection lens 1172. However, the configuration of the lens holder 374 is partially different from the case of the second embodiment.

Specifically, this Modification is different from the case of the second embodiment in that the lens holder 374 is constituted by a member made of a resin (e.g., polycarbonate resin lens).

Meanwhile, also in the lens holder 374 of this Modification, similarly to the lens holder 74 of the second embodiment, a front region 374A is formed to extend in a prismatic shape about the optical axis Ax, a rear region 374B is formed to extend in a cylindrical shape about the optical axis Ax, and the third lens 1172C and the fourth lens 1172D are supported by a front end portion 374Bc of the rear region 374B in a state where the third lens 1172C and the fourth lens 1172D are positioned.

In the rear region 374B of the lens holder 374, a through hole 374Bd is formed at three locations in the vicinity of the front end thereof (specifically, a position immediately above the optical axis Ax and positions on both left and right sides of the optical axis Ax slightly below the optical axis Ax).

Each through hole 374Bd is formed in a rectangular shape, and an engaging piece 374Bd1 that obliquely extends to the inner peripheral side toward the front side of the unit is integrally formed with the lens holder 374 in each through hole 374Bd.

Then, the third lens 1172C and the fourth lens 1172D are accommodated in the cylindrical surface 374Bc2 of the front end portion 374Bc from the rear side of the unit in a state where the spacer 76D is sandwiched between the outer peripheral flange portions 1172Cc and 1172Dc. Each engaging piece 374Bd1 is engaged with the outer peripheral flange portion 1172Dc of the fourth lens 1172D in a state where the outer peripheral flange portion 1172Cc of the third lens 1172C abuts on an annular surface 374Bc1 of the lens holder 74 from the rear side of the unit, and thus, the third lens 1172C and the fourth lens 1172D are positioned with respect to the lens holder 374.

Figure 21:
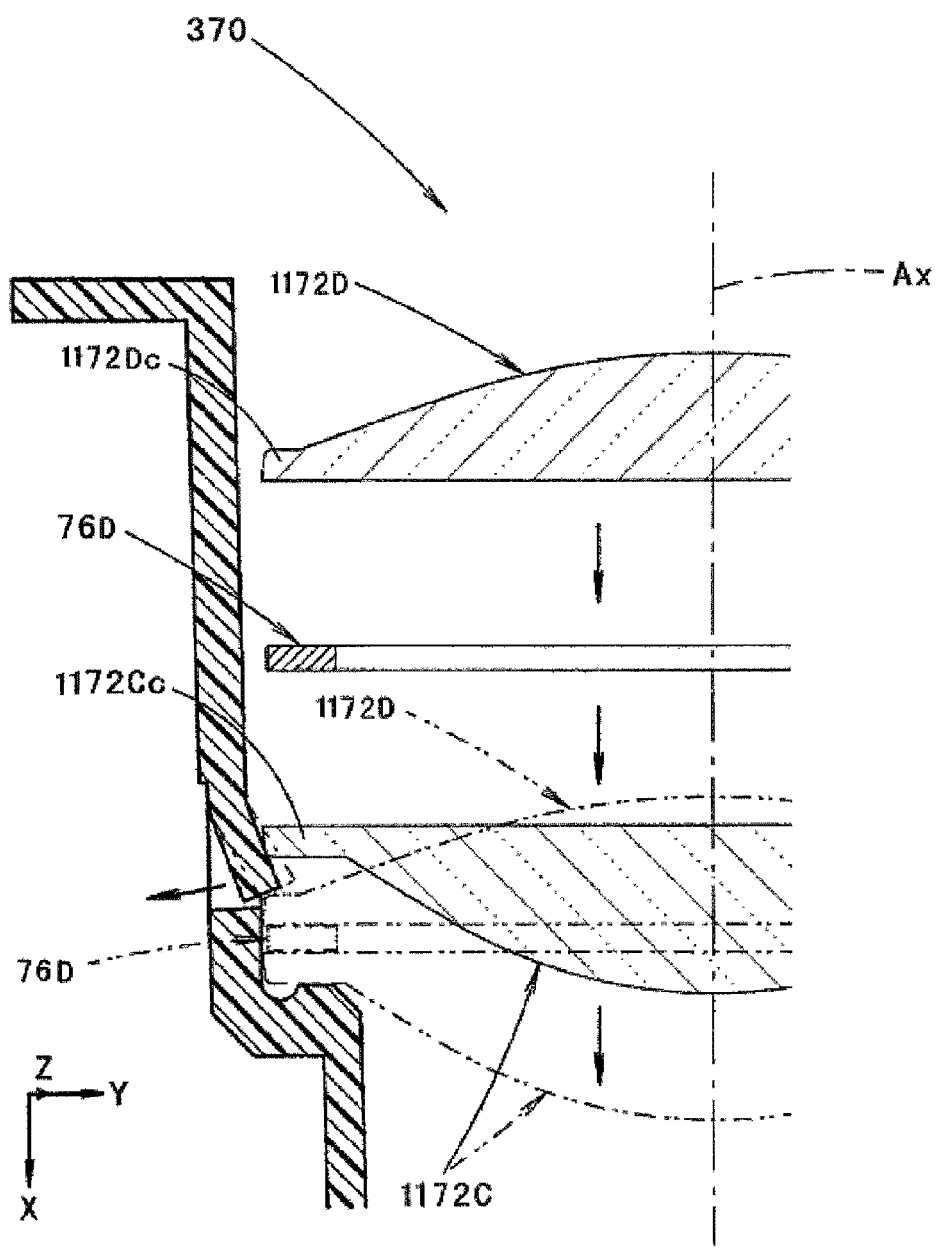
FIG. 21 is a view illustrating an operation of Modification 3, which is substantially similar to FIG. 16.
Figure 22:
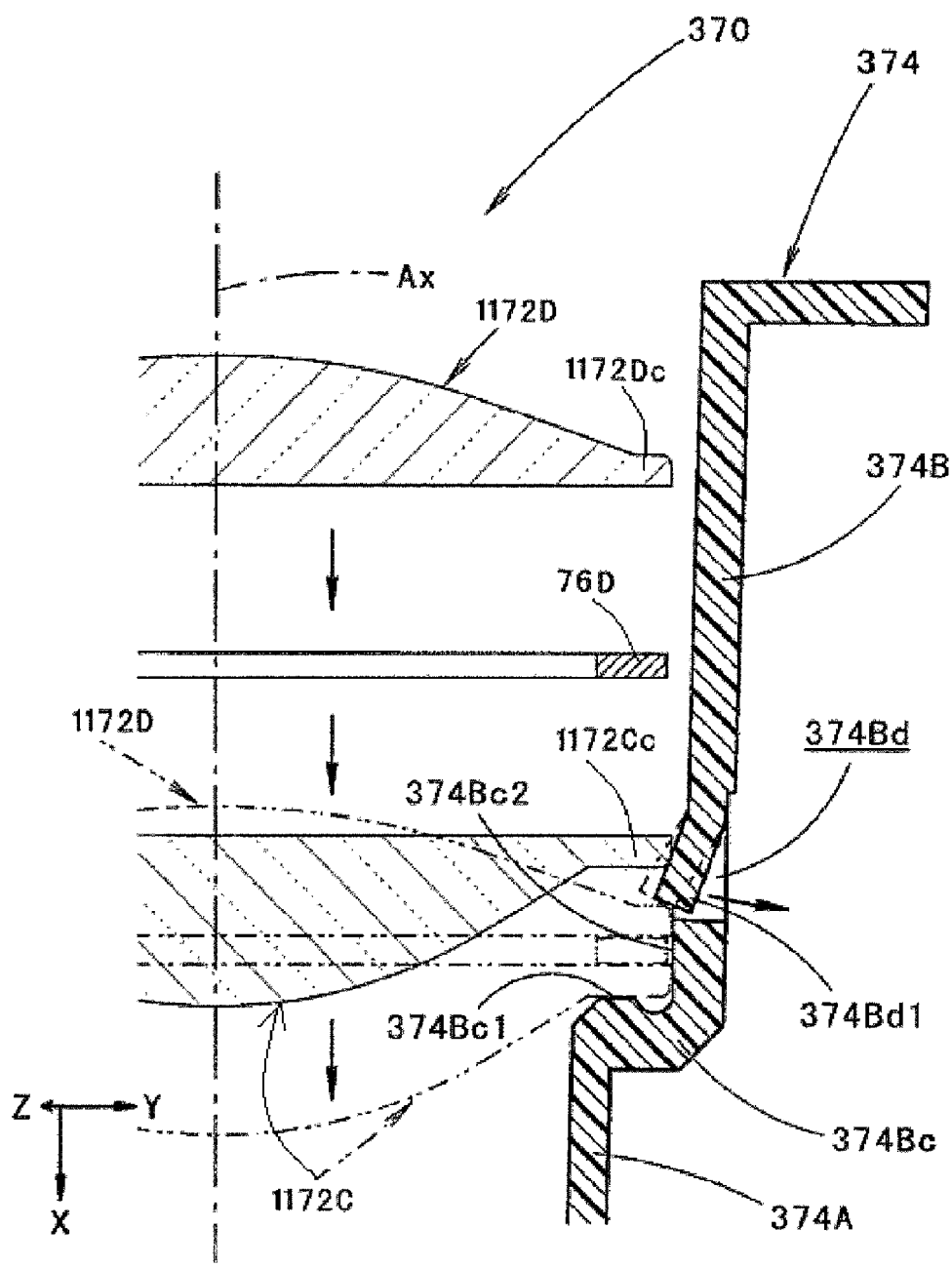
FIG. 22 is a view illustrating an operation of Modification 3, which is substantially similar to FIG. 16.

FIGS. 21 and 22 are views illustrating a state when the lens-side sub-assembly 370 of the lamp unit 310 is assembled, which is similar to FIG. 16. FIGS. 21 and 22 illustrate a cross-sectional shape at the cross-sectional position including each of the optical axis Ax and the through holes 374Bd at two locations of the left and the right.

As illustrated in FIGS. 21 and 22, when the third lens 1172C, the spacer 76D, and the fourth lens 1172D are sequentially inserted from the rear side of the unit into the inner space of the rear region 374B of the lens holder 74, each engaging piece 374Bd1 is elastically deformed to the outer peripheral side by abutting on each of the third lens 1172C, the spacer 76D, and the fourth lens 1172D. When the third lens 1172C, the spacer 76D, and the fourth lens 1172D are inserted to a position where they abut on the annular surface 374Bc1 of the lens holder 374, each engaging piece 374Bd1 engages with the fourth lens 1172D.

Therefore, the third lens 1172C and the fourth lens 1172D are positioned in the cylindrical surface 374Bc2 of the lens holder 374 in a state where the spacer 76D is sandwiched between them.

Also when adopting the configuration of this Modification, the same operation effect as in the case of the second embodiment may be obtained.

Further, since the lens holder 374 in this Modification is constituted by a member made of a resin, and the engaging piece 374Bd1 is integrally formed with the lens holder 374 at three locations in the portion in the vicinity of the front end of the rear region 374B, the leaf spring 78 of the second embodiment becomes unnecessary. Therefore, the third lens 1172C and the fourth lens 1172D can be reliably positioned with respect to the front-rear direction of the unit without increasing the number of components.

Modification 4 of Second Embodiment

Next, Modification 4 of the second embodiment will be described.

Figure 23:
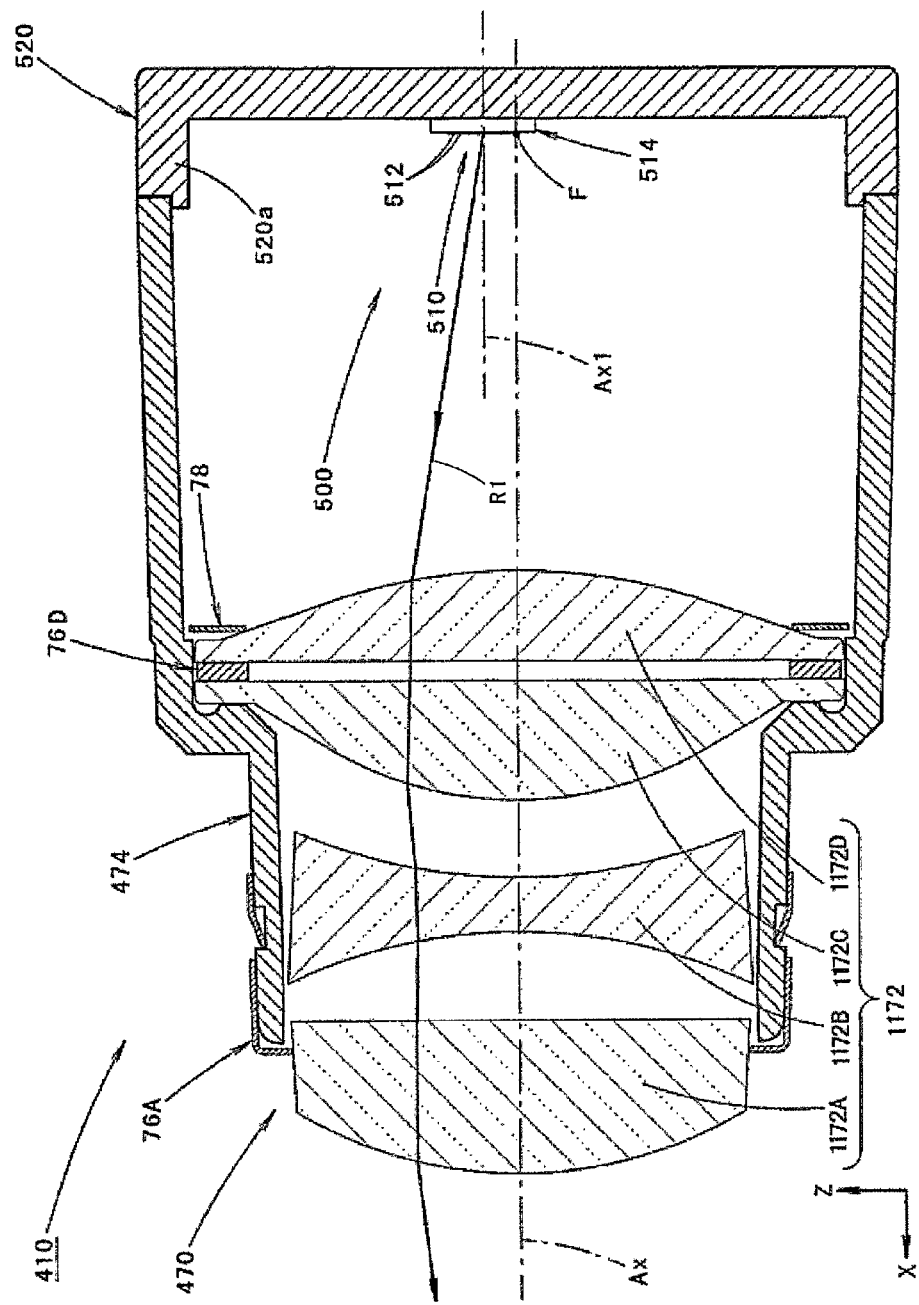
FIG. 23 is a view illustrating Modification 4 of the second embodiment, which is substantially similar to FIG. 15.

FIG. 23 is a view illustrating a lamp unit 410 according to this Modification, which is similar to FIG. 15.

As illustrated in FIG. 23, the lamp unit 410 according to this Modification is similar to the case of the second embodiment with respect to the configuration of a lens-side sub-assembly 470, but is significantly different from the case of the second embodiment in that a light source unit 500 is provided instead of the spatial light modulation unit 20 and the light source-side sub-assembly 50 of the second embodiment.

The light source unit 500 is configured such that a micro LED 510 is supported by a support member 520. The micro LED 510 is configured such that a plurality of light emitting elements 512 disposed in a matrix shape is supported by a substrate 514. The plurality of light emitting elements 512 is constituted by approximately 1,000 light emitting diodes that emit white light, and is configured to be able to emit light individually.

The micro LED 510 is disposed to be located on the vertical plane orthogonal to the optical axis Ax at the rear focal point F of the projection lens 1172. The micro LED 510 is disposed such that, similarly to the second embodiment, the central axis Ax1 thereof extends in the front-rear direction of the unit in a state of being displaced upward with respect to the optical axis Ax.

The lens-side sub-assembly 470 of this Modification is also configured such that the projection lens 1172 is supported by a lens holder 474, but is different from the case of the second embodiment in that it is supported by an outer peripheral edge portion 520a of the support member 520 at the rear end portion of the lens holder 474. The third lens 1172C is an example of the second plano-convex lens, and the fourth lens 1172D is an example of the first plano-convex lens.

Then, the lamp unit 410 according to this Modification is configured such that light emitted each of the plurality of light emitting elements 512 that constitute the micro LED 510 is directly incident on the projection lens 1172.

Also when adopting the configuration of this Modification, the projection lens 1172 is supported by the lens holder 474 as the lens-side sub-assembly 470 with the same configuration as the case of the second embodiment, and thus, the same operation effect as in the case of the second embodiment may be obtained.

The numerical values shown as specifications in the embodiments and Modifications thereof are merely examples, and, of course, the numerical values may be appropriately set to different values.

Further, the present disclosure is not limited to the configurations described in the above embodiments and Modifications thereof, and configurations with various other changes may be adopted.

What is claimed is:

1. A lamp unit that irradiates light emitted from a light source and reflected by a spatial light modulator, toward a front of the lamp unit through a projection lens,
   wherein the projection lens is constituted by a plurality of lenses disposed side by side in a front-rear direction of the lamp unit,
   the plurality of lenses are supported by a common lens holder, and
   the plurality of lenses include:
      a glass lens configured by a biconvex lens and located on a rearmost side of the lamp unit; and
      at least two resin lenses including a biconcave lens and a plano-convex lens, and located other than the rearmost side of the lamp unit.

2. The lamp unit according to claim 1, wherein an outer diameter of the glass lens is set to be larger than an outer diameter of the resin lens.

3. The lamp unit according to claim 2, wherein the glass lens has a circular outer shape, and the at least two resin lenses have a rectangular outer shape.

4. The lamp unit according to claim 2, wherein the glass lens is fixed to the lens holder at a portion that protrudes toward an outer peripheral side from the at least two resin lenses.

5. The lamp unit according to claim 4, wherein a plurality of through holes is formed in a circumferential direction of the lens holder, and the glass lens is fixed to the lens holder by a plurality of clips disposed through the plurality of through holes.

6. The lamp unit according to claim 1, wherein the spatial light modulator includes a plurality of reflection elements that reflects light from the light source, and is configured to selectively take a first angular position that reflects toward the projection lens and a second angular position that reflects toward a direction deviated from the projection lens, as an angular position of each reflection element, and the lens holder is made of metal, and is configured to shield light reflected from the reflection element at the second angular position.

7. The lamp unit according to claim 1, wherein the biconcave lens is provided between the plano-convex lens and the glass lens.

8. A lamp unit configured to irradiate light from a plurality of light emitting control elements disposed in a matrix shape, toward a front of the lamp unit through a projection lens, wherein the projection lens is constituted by a plurality of lenses disposed side by side in a front-rear direction of the lamp unit, the plurality of lenses are supported by a common lens holder, and the plurality of lenses include;

a first plano-convex lens located on a rearmost side of the lamp unit and having a convex-curved surface that bulges toward the rear of the lamp unit;

a second plano-convex lens adjacent to a front side of the first plano-convex lens and having a convex-curved surface that bulges toward the front of the lamp unit; and at least two lenses including a biconcave lens and a third plano-convex lens, and located at a front side of the second plano-convex lens.

9. The lamp unit according to claim 8, wherein the first plano-convex lens is a glass lens.

10. The lamp unit according to claim 8, wherein the second plano-convex lens is a resin lens.

11. The lamp unit according to claim 10, wherein a protrusion is formed on an outer peripheral edge portion of a rear surface of the second plano-convex lens to define a distance between the first plano-convex lens and the second plano-convex lens by abutting on a front surface of the first plano-convex lens.

12. The lamp unit according to claim 8, wherein an annular-shaped spacer is disposed between the first plano-convex lens and the second plano-convex lens.

13. The lamp unit according to claim 8, wherein a plurality of through holes are formed in a circumferential direction of the lens holder, and a leaf spring is disposed on a rear side of the lamp unit from the first plano-convex lens to elastically press the first plano-convex lens toward a front side of the lamp unit in a state of being locked to the plurality of through holes.

14. The lamp unit according to claim 8, wherein the lens holder is constituted by a resin member that includes a plurality of through holes formed in a circumferential direction, and is integrally formed with an engaging piece that obliquely extends toward a front side of the lamp unit on an inner peripheral side in each through hole, and each engaging piece is configured to be engaged with the first plano-convex lens when the first plano-convex lens is inserted from the rear side of the lamp unit to a position abutting on the lens holder.

15. The lamp unit according to claim 8, wherein the biconcave lens is provided between the second plano-convex lens and the third plano-convex lens.

16. The lamp unit according to claim 8, wherein the second plano-convex lens is a glass lens.

17. The lamp unit according to claim 8, wherein the at least two lenses are resin lenses.

* * * * *